(12) United States Patent
Cho et al.

(10) Patent No.: US 12,492,233 B2
(45) Date of Patent: Dec. 9, 2025

(54) COMPOSITION COMPRISING MLS-STAT3 FOR PREVENTION OR TREATMENT OF IMMUNE DISEASE

(71) Applicant: THE CATHOLIC UNIVERSITY OF KOREA INDUSTRY-ACADEMIC COOPERATION FOUNDATION, Seoul (KR)

(72) Inventors: Mi-La Cho, Seoul (KR); Sung-Hwan Park, Seoul (KR); Seon-Yeong Lee, Seoul (KR); Su-Jin Moon, Seoul (KR); Eun-kyung Kim, Seoul (KR); Jun-Geol Ryu, Seoul (KR); Si-Yeong Choi, Seoul (KR); Jeong-Won Choi, Seoul (KR); Kyung-Ah Jung, Goyang-si (KR); A-Ram Lee, Jinju-si (KR); Chul-Woo Yang, Seoul (KR); Jeong-Hyeon Moon, Gumi-si (KR)

(73) Assignee: THE CATHOLIC UNIVERSITY OF KOREA INDUSTRY-ACADEMIC COOPERATION FOUNDATION, Seoul (KR)

( * ) Notice: Subject to any disclaimer, the term of this patent is extended or adjusted under 35 U.S.C. 154(b) by 1130 days.

(21) Appl. No.: 17/426,023

(22) PCT Filed: Jan. 28, 2020

(86) PCT No.: PCT/KR2020/001287
§ 371 (c)(1),
(2) Date: Jul. 27, 2021

(87) PCT Pub. No.: WO2020/159191
PCT Pub. Date: Aug. 6, 2020

(65) Prior Publication Data
US 2022/0251155 A1 Aug. 11, 2022

(30) Foreign Application Priority Data
Jan. 28, 2019 (KR) ........................ 10-2019-0010584

(51) Int. Cl.
| | | |
|---|---|---|
| C07K 14/47 | (2006.01) | |
| A61K 38/00 | (2006.01) | |
| A61K 48/00 | (2006.01) | |
| A61P 1/00 | (2006.01) | |
| A61P 19/02 | (2006.01) | |
| A61P 29/00 | (2006.01) | |
| A61P 37/06 | (2006.01) | |

(52) U.S. Cl.
CPC ...... *C07K 14/4705* (2013.01); *A61K 48/0066* (2013.01); *A61P 1/00* (2018.01); *A61P 19/02* (2018.01); *A61P 29/00* (2018.01); *A61P 37/06* (2018.01); *C07K 14/47* (2013.01); *A61K 38/00* (2013.01); *C07K 2319/07* (2013.01)

(58) Field of Classification Search
None
See application file for complete search history.

(56) References Cited

FOREIGN PATENT DOCUMENTS

KR  10-2018-0038156 A  4/2018

OTHER PUBLICATIONS

Zhang et al. (J Biol Chem. Oct. 25, 2013;288(43):31280-8) (Year: 2013).*
"OASH" (downloaded from URL: < https://www.womenshealth.gov/a-z-topics/inflammatory-bowel-disease#:~:text=Inflammatory%20bowel%20disease%20(IBD)%20is,%2C%20abdominal%20pain%2C%20and%20fever>) (Year: 2024).*
Costello et al. (Pancreat Disord Ther; Suppl 4; doi: 10.4172/2165-7092.S4-002) (Year: 2013).*
"Cleveland Clinic" (downloaded from URL:<https://my.clevelandclinic.org/health/diseases/16753-atherosclerosis-arterial-disease>) (Year: 2024).*
"Children's hospital" (downloaded from URL:<https://www.childrenshospital.org/conditions/autoimmune-diseases>) (Year: 2025).*
Joanna Wegrzyn et al., "Function of Mitochondrial Stat3 in Cellular Respiration", Science, Feb. 6, 2009, pp. 793-797, vol. 323.
Rui Yang et al., "Mitochondrial Stat3, the Need for Design Thinking", International Journal of Biological Sciences, Feb. 29, 2016, pp. 532-544, vol. 12, No. 5.
Qifang Zhang et al., "Mitochondrial Localized Stat3 Promotes Breast Cancer Growth via Phosphorylation of Serine 727", The Journal of Biological Chemistry, Oct. 25, 2013, pp. 31280-31288, vol. 288, No. 43.
Karol Szczepanek et al., "Mitochondrial-targeted Signal Transducer and Activator of Transcription 3 (STAT3) Protects against Ischemia-induced Changes in the Electron Transport Chain and the Generation of Reactive Oxygen Species", The Journal of Biological Chemistry, Aug. 26, 2011, pp. 29610-29620, vol. 286, No. 34.
International Search Report for PCT/KR2020/001287 dated, Jun. 19, 2020 (PCT/ISA/210).

* cited by examiner

*Primary Examiner* — Sergio Coffa
(74) *Attorney, Agent, or Firm* — Sughrue Mion, PLLC

(57) ABSTRACT

The present invention relates to: a recombinant peptide in which a Mitochondria Localization Sequence (MLS) peptide and the Signal Transducer and Activator of Transcription 3 (STAT3) are fused to each other; a recombinant vector carrying a polynucleotide coding for the recombinant peptide; and a composition comprising the recombinant peptide or the recombinant vector as an active ingredient for prevention or treatment of autoimmune disease or inflammatory disease, wherein the recombinant peptide or the recombinant vector allows STAT3 to be overexpressed in the mitochondria to enhance the mitochondrial function, resulting in inhibiting the expression of inflammatory cytokines including IL-17, whereby the composition may be advantageously used for preventing or treating autoimmune disease or inflammatory diseases.

2 Claims, 16 Drawing Sheets
Specification includes a Sequence Listing.

MLS-Mouse STAT3

SEQ ID NO: 2

FIG. 2B

SEQ ID NO: 1

KLAMSMSVLTPLLLRGLTGSARRLPVPRAKIHSLGGSMAQWNQLQQL
DTRYLEQLNQLYSDSFPMELRQFLAPWIESQDWAYAASKESHATLVF
HNLLGEIDQQYSRFLQESNVLYQHNLRRIKQFLQSRYLEKPMEIARIVA
RCLWEESRLLQTAATAAQQGGQANHPTAAVVTEKQQMLEQHLQDVR
KRVQDLEQKMKVVENLQDDFDFNYKTLKSQGDMQDLNGNNQSVTR
QKMQQLEQMLTALDQMRRSIVSELAGLLSAMEYVQKTLTDEELADWK
RRQQIACIGGPPNICLDRLENWITSLAESQLQTRQQIKKLEELQQKVSY
KGDPIVQHRPMLEERIVELFRNLMKSAFVVERQPCMPMHPDRPLVIK
TGVQFTTKVRLLVKFPELNYQLKIKVCIDKDSGDVAALRGSRKFNILGT
NTKVMNMEESNNGSLSAEFKHLTLREQRCGNGGRANCDASLIVTEEL
HLITFETEVYHQGLKIDLETHSLPVVVISNICQMPNAWASILWYNMLT
NNPKNVNFFTKPPIGTWDQVAEVLSWQFSSTTKRGLSIEQLTTLAEKL
LGPGVNYSGCQITWAKFCKENMAGKGFSFWVWLDNIIDLVKKYILAL
WNEGYIMGFISKERERAILSTKPPGTFLLRFSESSKEGGVTFTWVEKDI
SGKTQIQSVEPYTKQQLNNMSFAEIIMGYKIMDATNILVSPLVYLYPDI
PKEEAFGKYCRPESQEHPEADPGSAAPYLKTKFICVTPTTCSNTIDL
PMSPRTLDSLMQFGNMGEAEPSAGGQFESLTFDMDLTSECATSPMG
TDYKDDDDKStopVDSSGR

FIG. 3

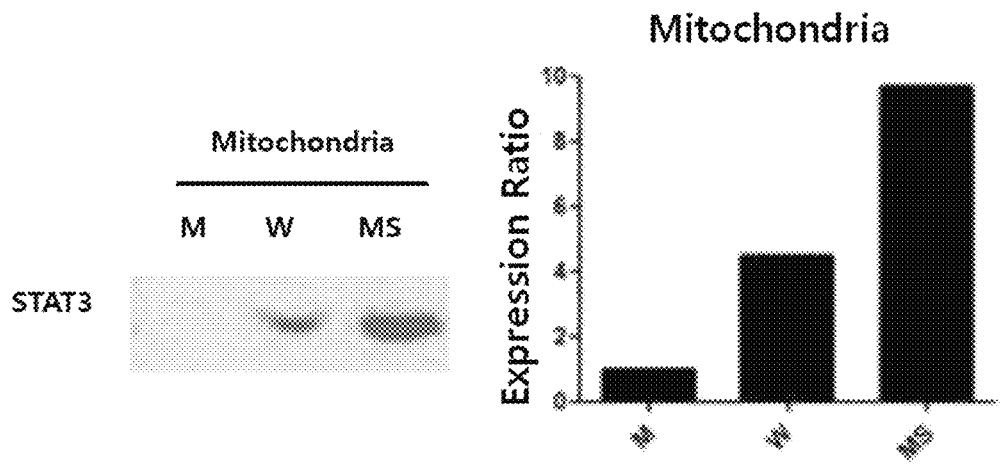

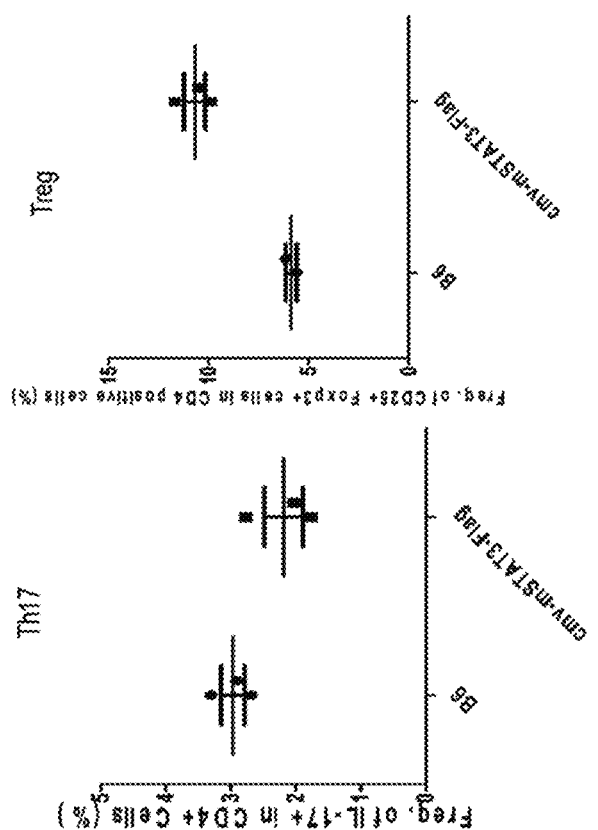
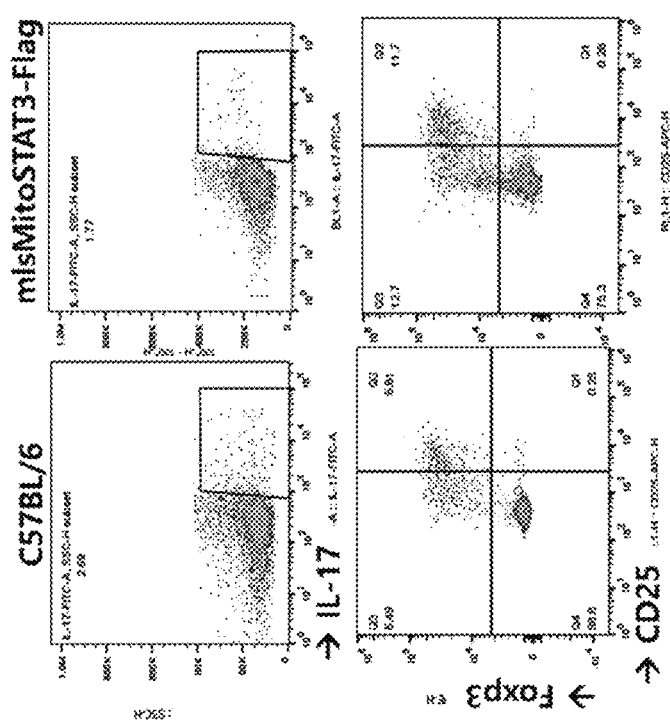
FIG. 13

SEQ ID NO: 4

FIG. 20B

SEQ ID NO: 3

MSVLTPLLLRGLTGSARRLPVPRAKIHSLLQVDLEMAQWNLQQLDTRYL
EQLHQLYSDSFPMELRQFLAPWIESQDWAYAASKESHATLVFHNLLGEID
QQYSRFLQESNVLYQHNLRRIKQFLQSRYLEKPMEIARIVARCLWEESRL
LGTAATAAQQGGQANHPTAAVVTEKQQMLEQHLQQVRKRVQQLEQKMKV
VENLQDDFDFNYKTLKSQGDMQDLNGNNQSVTRQKMQQLEQMLTALD
QMRRSIVSELAGLLSAMEYVQKTLTDEELADWKRRQQIACIGGPPNICLD
RLENWITSLAESQLQTRQQIKKLEELQQKVSYKGDPIVQHRPMLEERIVEL
FRNLMKSAFVVERQPCMPMHPDRPLVIKTGVQFTTKVRLLVKFPELNYQL
KIKVCIDKDSGDVAALRGSRKFNILGTNTKVMNMEESNNGSLSAEFKHLTL
REQRCGNGGRANCDASLIVTEELHLITFETEVYHQGLKIDLETHSLPVVVI
SNICQMPNAWASILWYNMLTNNPKNVRFFTRPPIQTWDQVAEVLSWQFS
STTKRGLSIEQLTTLAEKLLGPGVNYSGCQITWAKFCKENMAGKGFSFWV
WLDNIIDLVKKYILALWNEGYIMGFISKERERAILSTKPPGTFLLRFSESSK
EGGVTFTWVEKDISGKTQIQSVEPYTKQQLNNMSFAEIIMGYKIMDATNIL
VSPLYYLYPDIPKEEAFGKYCRPESQEHPEADPGSAAPYLKTKFICVTPTT
CSNTIDLPMSPRTLDSLMQFGNNGEGAEPSAGGQFESLTFDMELTSECAT
SPMAAAYAAAEQKLISEEDLNGAAStop

```
                        SEQUENCE LISTING

<160> NUMBER OF SEQ ID NOS: 4

<210> SEQ ID NO 1
<211> LENGTH: 823
<212> TYPE: PRT
<213> ORGANISM: Artificial Sequence
<220> FEATURE:
<223> OTHER INFORMATION: mouse MLS-STAT3 peptide

<400> SEQUENCE: 1

Lys Leu Ala Met Ser Met Ser Val Leu Thr Pro Leu Leu Leu Arg Gly
1               5                   10                  15

Leu Thr Gly Ser Ala Arg Arg Leu Pro Val Pro Arg Ala Lys Ile His
                20                  25                  30

Ser Leu Gly Gly Ser Met Ala Gln Trp Asn Gln Leu Gln Gln Leu Asp
            35                  40                  45

Thr Arg Tyr Leu Glu Gln Leu His Gln Leu Tyr Ser Asp Ser Phe Pro
    50                  55                  60

Met Glu Leu Arg Gln Phe Leu Ala Pro Trp Ile Glu Ser Gln Asp Trp
65                  70                  75                  80

Ala Tyr Ala Ala Ser Lys Glu Ser His Ala Thr Leu Val Phe His Asn
                85                  90                  95

Leu Leu Gly Glu Ile Asp Gln Gln Tyr Ser Arg Phe Leu Gln Glu Ser
```

```
                    100                 105                 110
Asn Val Leu Tyr Gln His Asn Leu Arg Arg Ile Lys Gln Phe Leu Gln
            115                 120                 125
Ser Arg Tyr Leu Glu Lys Pro Met Glu Ile Ala Arg Ile Val Ala Arg
            130                 135                 140
Cys Leu Trp Glu Glu Ser Arg Leu Leu Gln Thr Ala Ala Thr Ala Ala
145                 150                 155                 160
Gln Gln Gly Gly Gln Ala Asn His Pro Thr Ala Ala Val Val Thr Glu
                165                 170                 175
Lys Gln Gln Met Leu Glu Gln His Leu Gln Asp Val Arg Lys Arg Val
                180                 185                 190
Gln Asp Leu Glu Gln Lys Met Lys Val Val Glu Asn Leu Gln Asp Asp
            195                 200                 205
Phe Asp Phe Asn Tyr Lys Thr Leu Lys Ser Gln Gly Asp Met Gln Asp
            210                 215                 220
Leu Asn Gly Asn Asn Gln Ser Val Thr Arg Gln Lys Met Gln Gln Leu
225                 230                 235                 240
Glu Gln Met Leu Thr Ala Leu Asp Gln Met Arg Arg Ser Ile Val Ser
                245                 250                 255
Glu Leu Ala Gly Leu Leu Ser Ala Met Glu Tyr Val Gln Lys Thr Leu
                260                 265                 270
Thr Asp Glu Glu Leu Ala Asp Trp Lys Arg Arg Gln Gln Ile Ala Cys
            275                 280                 285
Ile Gly Gly Pro Pro Asn Ile Cys Leu Asp Arg Leu Glu Asn Trp Ile
            290                 295                 300
Thr Ser Leu Ala Glu Ser Gln Leu Gln Thr Arg Gln Gln Ile Lys Lys
305                 310                 315                 320
Leu Glu Glu Leu Gln Gln Lys Val Ser Tyr Lys Gly Asp Pro Ile Val
                325                 330                 335
Gln His Arg Pro Met Leu Glu Glu Arg Ile Val Glu Leu Phe Arg Asn
                340                 345                 350
Leu Met Lys Ser Ala Phe Val Val Glu Arg Gln Pro Cys Met Pro Met
            355                 360                 365
His Pro Asp Arg Pro Leu Val Ile Lys Thr Gly Val Gln Phe Thr Thr
            370                 375                 380
Lys Val Arg Leu Leu Val Lys Phe Pro Glu Leu Asn Tyr Gln Leu Lys
385                 390                 395                 400
Ile Lys Val Cys Ile Asp Lys Asp Ser Gly Asp Val Ala Ala Leu Arg
                405                 410                 415
Gly Ser Arg Lys Phe Asn Ile Leu Gly Thr Asn Thr Lys Val Met Asn
                420                 425                 430
Met Glu Glu Ser Asn Asn Gly Ser Leu Ser Ala Glu Phe Lys His Leu
            435                 440                 445
Thr Leu Arg Glu Gln Arg Cys Gly Asn Gly Gly Arg Ala Asn Cys Asp
            450                 455                 460
Ala Ser Leu Ile Val Thr Glu Glu Leu His Leu Ile Thr Phe Glu Thr
465                 470                 475                 480
Glu Val Tyr His Gln Gly Leu Lys Ile Asp Leu Glu Thr His Ser Leu
                485                 490                 495
Pro Val Val Val Ile Ser Asn Ile Cys Gln Met Pro Asn Ala Trp Ala
            500                 505                 510
Ser Ile Leu Trp Tyr Asn Met Leu Thr Asn Asn Pro Lys Asn Val Asn
            515                 520                 525
```

Phe Phe Thr Lys Pro Pro Ile Gly Thr Trp Asp Gln Val Ala Glu Val
    530                 535                 540

Leu Ser Trp Gln Phe Ser Ser Thr Thr Lys Arg Gly Leu Ser Ile Glu
545                 550                 555                 560

Gln Leu Thr Thr Leu Ala Glu Lys Leu Leu Gly Pro Gly Val Asn Tyr
                565                 570                 575

Ser Gly Cys Gln Ile Thr Trp Ala Lys Phe Cys Lys Glu Asn Met Ala
                580                 585                 590

Gly Lys Gly Phe Ser Phe Trp Val Trp Leu Asp Asn Ile Ile Asp Leu
            595                 600                 605

Val Lys Lys Tyr Ile Leu Ala Leu Trp Asn Glu Gly Tyr Ile Met Gly
610                 615                 620

Phe Ile Ser Lys Glu Arg Glu Arg Ala Ile Leu Ser Thr Lys Pro Pro
625                 630                 635                 640

Gly Thr Phe Leu Leu Arg Phe Ser Glu Ser Ser Lys Glu Gly Gly Val
                645                 650                 655

Thr Phe Thr Trp Val Glu Lys Asp Ile Ser Gly Lys Thr Gln Ile Gln
                660                 665                 670

Ser Val Glu Pro Tyr Thr Lys Gln Gln Leu Asn Asn Met Ser Phe Ala
            675                 680                 685

Glu Ile Ile Met Gly Tyr Lys Ile Met Asp Ala Thr Asn Ile Leu Val
690                 695                 700

Ser Pro Leu Val Tyr Leu Tyr Pro Asp Ile Pro Lys Glu Glu Ala Phe
705                 710                 715                 720

Gly Lys Tyr Cys Arg Pro Glu Ser Gln Glu His Pro Glu Ala Asp Pro
                725                 730                 735

Gly Ser Ala Ala Pro Tyr Leu Lys Thr Lys Phe Ile Cys Val Thr Pro
                740                 745                 750

Thr Thr Cys Ser Asn Thr Ile Asp Leu Pro Met Ser Pro Arg Thr Leu
            755                 760                 765

Asp Ser Leu Met Gln Phe Gly Asn Asn Gly Glu Gly Ala Glu Pro Ser
770                 775                 780

Ala Gly Gly Gln Phe Glu Ser Leu Thr Phe Asp Met Asp Leu Thr Ser
785                 790                 795                 800

Glu Cys Ala Thr Ser Pro Met Gly Thr Asp Tyr Lys Asp Asp Asp Asp
                805                 810                 815

Lys Val Asp Ser Ser Gly Arg
                820

<210> SEQ ID NO 2
<211> LENGTH: 2472
<212> TYPE: DNA
<213> ORGANISM: Artificial Sequence
<220> FEATURE:
<223> OTHER INFORMATION: mouse MLS-STAT3 nucleotide

<400> SEQUENCE: 2
aagcttgcca tgtccatgtc cgtcctgacg ccgctgctgc tgcggggctt gacaggctcg     60
gcccggcggc tcccagtgcc gcgcgccaag atccattcgt tggggggatc catggctcag    120
tggaaccagc tgcagcagct ggacacacgc tacctggagc agctgcacca gctgtacagc    180
gacagcttcc ccatggagct gcggcagttc ctggcacctt ggattgagag tcaagactgg    240
gcatatgcag ccagcaaaga gtcacatgcc acgttggtgt ttcataatct cttgggtgaa    300
attgaccagc aatatagccg attcctgcaa gagtccaatg tcctctatca gcacaacctt    360

```
cgaagaatca agcagtttct gcagagcagg tatcttgaga agccaatgga aattgcccgg      420
atcgtggccc gatgcctgtg ggaagagtct cgcctcctcc agacggcagc cacggcagcc      480
cagcaagggg gccaggccaa ccacccaaca gccgccgtag tgacagagaa gcagcagatg      540
ttggagcagc atcttcagga tgtccggaag cgagtgcagg atctagaaca gaaaatgaag      600
gtggtggaga acctccagga cgactttgat ttcaactaca aaaccctcaa gagccaagga      660
gacatgcagg atctgaatgg aaacaaccag tctgtgacca gacagaagat gcagcagctg      720
gaacagatgc tcacagccct ggaccagatg cggagaagca ttgtgagtga gctggcgggg      780
ctcttgtcag caatggagta cgtgcagaag acactgactg atgaagagct ggctgactgg      840
aagaggcggc agcagatcgc gtgcatcgga ggccctccca acatctgcct ggaccgtctg      900
gaaaactgga taacttcatt agcagaatct caacttcaga cccgccaaca aattaagaaa      960
ctggaggagc tgcagcagaa agtgtcctac aagggcgacc ctatcgtgca gcaccggccc     1020
atgctggagg agaggatcgt ggagctgttc agaaacttaa tgaagagtgc cttcgtggtg     1080
gagcggcagc cctgcatgcc catgcacccg gaccggccct tagtcatcaa gactggtgtc     1140
cagtttacca cgaaagtcag gttgctggtc aaatttcctg agttgaatta tcagcttaaa     1200
attaaagtgt gcattgataa agactctggg gatgttgctg ccctcagagg gtctcggaaa     1260
tttaacattc tgggcacgaa cacaaaagtg atgaacatgg aggagtctaa caacggcagc     1320
ctgtctgcag agttcaagca cctgaccctt agggagcaga gatgtgggaa tggaggccgt     1380
gccaattgtg atgcctcctt gatcgtgact gaggagctgc acctgatcac cttcgagact     1440
gaggtgtacc accaaggcct caagattgac ctagagaccc actccttgcc agttgtggtg     1500
atctccaaca tctgtcagat gccaaatgct tgggcatcaa tcctgtggta taacatgctg     1560
accaataacc ccaagaacgt gaacttcttc actaagccgc caattggaac ctgggaccaa     1620
gtggccgagg tgctcagctg gcagttctcg tccaccacca gcggggggct gagcatcgag     1680
cagctgacaa cgctggctga aagctcccta gggcctggtg tgaactactc agggtgtcag     1740
atcacatggg ctaaattctg caaagaaaac atggctggca agggcttctc cttctgggtc     1800
tggctagaca atatcatcga ccttgtgaaa aagtatatct tggccctttg gaatgaaggg     1860
tacatcatgg gtttcatcag caaggagcgg gagcgggcca tcctaagcac aaagcccccg     1920
ggcaccttcc tactgcgctt cagcgagagc agcaaagaag gaggggtcac tttcacttgg     1980
gtggaaaagg acatcagtgg caagacccag atccagtctg tagagccata caccaagcag     2040
cagctgaaca acatgtcatt tgctgaaatc atcatgggct ataagatcat ggatgcgacc     2100
aacatcctgg tgtctccact tgtctacctc taccccgaca ttcccaagga ggaggcattt     2160
ggaaagtact gtaggcccga gagccaggag caccccgaag ccgacccagg tagtgctgcc     2220
ccgtacctga agaccaagtt catctgtgtg acaccaacga cctgcagcaa taccattgac     2280
ctgccgatgt cccccgcac tttagattca ttgatgcagt ttggaaataa cggtgaaggt     2340
gctgagccct cagcaggagg gcagtttgag tcgctcacgt ttgacatgga tctgacctcg     2400
gagtgtgcta cctccccat gggtaccgat tacaaggacg acgatgacaa gtaggtcgac     2460
tcgagcggcc gc                                                          2472
```

<210> SEQ ID NO 3
<211> LENGTH: 826
<212> TYPE: PRT
<213> ORGANISM: Artificial Sequence
<220> FEATURE:

<223> OTHER INFORMATION: human MLS-STAT3 peptide

<400> SEQUENCE: 3

```
Met Ser Val Leu Thr Pro Leu Leu Arg Gly Leu Thr Gly Ser Ala
1               5                   10                  15

Arg Arg Leu Pro Val Pro Arg Ala Lys Ile His Ser Leu Leu Gln Val
            20                  25                  30

Asp Leu Glu Met Ala Gln Trp Asn Gln Leu Gln Gln Leu Asp Thr Arg
            35                  40                  45

Tyr Leu Glu Gln Leu His Gln Leu Tyr Ser Asp Ser Phe Pro Met Glu
    50                  55                  60

Leu Arg Gln Phe Leu Ala Pro Trp Ile Glu Ser Gln Asp Trp Ala Tyr
65                  70                  75                  80

Ala Ala Ser Lys Glu Ser His Ala Thr Leu Val Phe His Asn Leu Leu
                85                  90                  95

Gly Glu Ile Asp Gln Gln Tyr Ser Arg Phe Leu Gln Glu Ser Asn Val
            100                 105                 110

Leu Tyr Gln His Asn Leu Arg Arg Ile Lys Gln Phe Leu Gln Ser Arg
    115                 120                 125

Tyr Leu Glu Lys Pro Met Glu Ile Ala Arg Ile Val Ala Arg Cys Leu
130                 135                 140

Trp Glu Glu Ser Arg Leu Leu Gln Thr Ala Ala Thr Ala Ala Gln Gln
145                 150                 155                 160

Gly Gly Gln Ala Asn His Pro Thr Ala Ala Val Val Thr Glu Lys Gln
                165                 170                 175

Gln Met Leu Glu Gln His Leu Gln Asp Val Arg Lys Arg Val Gln Asp
            180                 185                 190

Leu Glu Gln Lys Met Lys Val Val Glu Asn Leu Gln Asp Asp Phe Asp
    195                 200                 205

Phe Asn Tyr Lys Thr Leu Lys Ser Gln Gly Asp Met Gln Asp Leu Asn
210                 215                 220

Gly Asn Asn Gln Ser Val Thr Arg Gln Lys Met Gln Gln Leu Glu Gln
225                 230                 235                 240

Met Leu Thr Ala Leu Asp Gln Met Arg Arg Ser Ile Val Ser Glu Leu
                245                 250                 255

Ala Gly Leu Leu Ser Ala Met Glu Tyr Val Gln Lys Thr Leu Thr Asp
            260                 265                 270

Glu Glu Leu Ala Asp Trp Lys Arg Arg Gln Gln Ile Ala Cys Ile Gly
    275                 280                 285

Gly Pro Pro Asn Ile Cys Leu Asp Arg Leu Glu Asn Trp Ile Thr Ser
290                 295                 300

Leu Ala Glu Ser Gln Leu Gln Thr Arg Gln Gln Ile Lys Lys Leu Glu
305                 310                 315                 320

Glu Leu Gln Gln Lys Val Ser Tyr Lys Gly Asp Pro Ile Val Gln His
                325                 330                 335

Arg Pro Met Leu Glu Glu Arg Ile Val Glu Leu Phe Arg Asn Leu Met
            340                 345                 350

Lys Ser Ala Phe Val Val Glu Arg Gln Pro Cys Met Pro Met His Pro
    355                 360                 365

Asp Arg Pro Leu Val Ile Lys Thr Gly Val Gln Phe Thr Thr Lys Val
370                 375                 380

Arg Leu Leu Val Lys Phe Pro Glu Leu Asn Tyr Gln Leu Lys Ile Lys
385                 390                 395                 400
```

-continued

```
Val Cys Ile Asp Lys Asp Ser Gly Asp Val Ala Ala Leu Arg Gly Ser
                405                 410                 415
Arg Lys Phe Asn Ile Leu Gly Thr Asn Thr Lys Val Met Asn Met Glu
            420                 425                 430
Glu Ser Asn Asn Gly Ser Leu Ser Ala Glu Phe Lys His Leu Thr Leu
        435                 440                 445
Arg Glu Gln Arg Cys Gly Asn Gly Gly Arg Ala Asn Cys Asp Ala Ser
    450                 455                 460
Leu Ile Val Thr Glu Glu Leu His Leu Ile Thr Phe Glu Thr Glu Val
465                 470                 475                 480
Tyr His Gln Gly Leu Lys Ile Asp Leu Glu Thr His Ser Leu Pro Val
                485                 490                 495
Val Val Ile Ser Asn Ile Cys Gln Met Pro Asn Ala Trp Ala Ser Ile
            500                 505                 510
Leu Trp Tyr Asn Met Leu Thr Asn Asn Pro Lys Asn Val Asn Phe Phe
        515                 520                 525
Thr Lys Pro Pro Ile Gly Thr Trp Asp Gln Val Ala Glu Val Leu Ser
    530                 535                 540
Trp Gln Phe Ser Ser Thr Thr Lys Arg Gly Leu Ser Ile Glu Gln Leu
545                 550                 555                 560
Thr Thr Leu Ala Glu Lys Leu Leu Gly Pro Gly Val Asn Tyr Ser Gly
                565                 570                 575
Cys Gln Ile Thr Trp Ala Lys Phe Cys Lys Glu Asn Met Ala Gly Lys
            580                 585                 590
Gly Phe Ser Phe Trp Val Trp Leu Asp Asn Ile Ile Asp Leu Val Lys
        595                 600                 605
Lys Tyr Ile Leu Ala Leu Trp Asn Glu Gly Tyr Ile Met Gly Phe Ile
    610                 615                 620
Ser Lys Glu Arg Glu Arg Ala Ile Leu Ser Thr Lys Pro Pro Gly Thr
625                 630                 635                 640
Phe Leu Leu Arg Phe Ser Glu Ser Ser Lys Glu Gly Gly Val Thr Phe
                645                 650                 655
Thr Trp Val Glu Lys Asp Ile Ser Gly Lys Thr Gln Ile Gln Ser Val
            660                 665                 670
Glu Pro Tyr Thr Lys Gln Gln Leu Asn Asn Met Ser Phe Ala Glu Ile
        675                 680                 685
Ile Met Gly Tyr Lys Ile Met Asp Ala Thr Asn Ile Leu Val Ser Pro
    690                 695                 700
Leu Val Tyr Leu Tyr Pro Asp Ile Pro Lys Glu Glu Ala Phe Gly Lys
705                 710                 715                 720
Tyr Cys Arg Pro Glu Ser Gln Glu His Pro Glu Ala Asp Pro Gly Ser
                725                 730                 735
Ala Ala Pro Tyr Leu Lys Thr Lys Phe Ile Cys Val Thr Pro Thr Thr
            740                 745                 750
Cys Ser Asn Thr Ile Asp Leu Pro Met Ser Pro Arg Thr Leu Asp Ser
        755                 760                 765
Leu Met Gln Phe Gly Asn Asn Gly Glu Gly Ala Glu Pro Ser Ala Gly
    770                 775                 780
Gly Gln Phe Glu Ser Leu Thr Phe Asp Met Glu Leu Thr Ser Glu Cys
785                 790                 795                 800
Ala Thr Ser Pro Met Ala Ala Tyr Ala Ala Glu Gln Lys Leu
                805                 810                 815
Ile Ser Glu Glu Asp Leu Asn Gly Ala Ala
```

<210> SEQ ID NO 4
<211> LENGTH: 2481
<212> TYPE: DNA
<213> ORGANISM: Artificial Sequence
<220> FEATURE:
<223> OTHER INFORMATION: human MLS-STAT3 nucleotide

<400> SEQUENCE: 4

```
atgtccgtcc tgacgccgct gctgctgcgg ggcttgacag gctcggcccg gcggctccca      60
gtgccgcgcg ccaagatcca ttcgttgctg caggtcgacc tcgagatggc ccaatggaat     120
cagctacagc agcttgacac acggtacctg gagcagctcc atcagctcta cagtgacagc     180
ttcccaatgg agctgcggca gtttctggcc ccttggattg agagtcaaga ttgggcatat     240
gcggccagca agaatcaca tgccactttg gtgtttcata atctcctggg agagattgac     300
cagcagtata gccgcttcct gcaagagtcg aatgttctct atcagcacaa tctacgaaga     360
atcaagcagt ttcttcagag caggtatctt gagaagccaa tggagattgc ccggattgtg     420
gcccggtgcc tgtgggaaga atcacgcctt ctacagactg cagccactgc ggcccagcaa     480
gggggccagg ccaaccaccc cacagcagcc gtggtgacgg agaagcagca gatgctggag     540
cagcaccttc aggatgtccg gaagagagtg caggatctag aacagaaaat gaaagtggta     600
gagaatctcc aggatgactt tgatttcaac tataaaccc tcaagagtca aggagacatg     660
caagatctga atggaaacaa ccagtcagtg accaggcaga gatgcagca gctggaacag     720
atgctcactg cgctggacca gatgcggaga agcatcgtga gtgagctggc ggggcttttg     780
tcagcgatgg agtacgtgca gaaaactctc acggacgagg agctggctga ctggaagagg     840
cggcaacaga ttgcctgcat tggaggcccg cccaacatct gcctagatcg ctagaaaac     900
tggataacgt cattagcaga atctcaactt cagacccgtc aacaaattaa gaaactggag     960
gagttgcagc aaaaagtttc ctacaaaggg gacccccattg tacagcaccg gccgatgctg    1020
gaggagagaa tcgtggagct gtttagaaac ttaatgaaaa gtgcctttgt ggtggagcgg    1080
cagccctgca tgcccatgca tcctgaccgg cccctcgtca tcaagaccgg cgtccagttc    1140
actactaaag tcaggttgct ggtcaaattc cctgagttga attatcagct taaaattaaa    1200
gtgtgcattg acaaagactc tggggacgtt gcagctctca gaggatcccg gaaatttaac    1260
attctgggca caaacacaaa agtgatgaac atggaagaat ccaacaacgg cagcctctct    1320
gcagaattca acacttgac cctgagggag cagagatgtg ggaatggggg ccgagccaat    1380
tgtgatgctt ccctgattgt gactgaggag ctgcacctga tcacctttga daccgaggtg    1440
tatcaccaag gcctcaagat tgacctagag acccactcct tgccagttgt ggtgatctcc    1500
aacatctgtc agatgccaaa tgcctgggcg tccatcctgt ggtacaacat gctgaccaac    1560
aatcccaaga atgtaaactt ttttaccaag ccccccaattg aacctgggga tcaagtggcc    1620
gaggtcctga gctggcagtt ctcctccacc accaagcgag gactgagcat cgagcagctg    1680
actacactgg cagagaaact cttgggacct ggtgtgaatt attcagggtg tcagatcaca    1740
tgggctaaat tttgcaaaga aaacatggct ggcaagggct tctccttctg ggtctggctg    1800
gacaatatca ttgaccttgt gaaaagtac atcctggccc tttggaacga agggtacatc    1860
atgggctttta tcagtaagga gcgggagcgg gccatcttga gcactaagcc tccaggcacc    1920
ttcctgctaa gattcagtga aagcagcaaa gaaggaggcg tcactttcac ttgggtggag    1980
aaggacatca gcggtaagac ccagatccag tccgtggaac catacacaaa gcagcagctg    2040
```

```
aacaacatgt catttgctga aatcatcatg ggctataaga tcatggatgc taccaatatc    2100
ctggtgtctc cactggtcta tctctatcct gacattccca aggaggaggc attcggaaag    2160
tattgtcggc cagagagcca ggagcatcct gaagctgacc caggtagcgc tgccccatac    2220
ctgaagacca agtttatctg tgtgacacca acgacctgca gcaataccat tgacctgccg    2280
atgtcccccc gcactttaga ttcattgatg cagtttggaa ataatggtga aggtgctgaa    2340
ccctcagcag gagggcagtt tgagtccctc acctttgaca tggagttgac ctcggagtgc    2400
gctacctccc ccatggcggc cgcatatgcg gccgcagaac aaaaactcat ctcagaagag    2460
gatctgaatg gggccgcata g                                              2481
```

COMPOSITION COMPRISING MLS-STAT3 FOR PREVENTION OR TREATMENT OF IMMUNE DISEASE

CROSS REFERENCE TO RELATED APPLICATIONS

This application is a National Stage of International Application No. PCT/KR2020/001287 filed Jan. 28, 2020, claiming priority based on Korean Patent Application No. 10-2019-0010584 filed Jan. 28, 2019, the entire disclosures of which are incorporated herein by reference.

INCORPORATION BY REFERENCE OF SEQUENCE LISTING

The content of the electronically submitted sequence listing, file name: Q266018sequencelistingasfiled.TXT; size: 21,455 bytes; and date of creation: Jul. 27, 2021, filed herewith, is incorporated herein by reference in its entirety.

TECHNICAL FIELD

The present invention relates to a recombinant peptide in which mitochondria localization sequence (MLS) peptide and signal transducer and activator of transcription 3 (STAT3) are fused; a recombinant vector comprising a polynucleotide encoding the recombinant peptide; and a composition for preventing or treating an autoimmune disease or an inflammatory disease, the composition comprising the recombinant peptide or the recombinant vector.

BACKGROUND ART

Diseases caused by immune hypersensitivity are increasing worldwide. However, the fundamental causes of these diseases have not been sufficiently identified. Currently, a treatment method for a disease caused by an excessive immune response is to administer immunosuppressants alone or in combination, thereby relieving or reducing various symptoms caused by the disease.

Immunosuppressants refer to various substances used to reduce or block the host's ability to make antibodies (humoral immune response) or to induce cellular immune responses against the action of an antigen. These immunosuppressants may be usefully used not only in the field of organ transplantation, but also in autoimmune diseases such as lupus and rheumatoid arthritis, and skin hypersensitivity reactions such as atopy and allergies. An excellent immunosuppressant is required to regulate the immune response imbalance, ensure safety for the human body, and have a low frequency of disease recurrence during the long-term treatment.

Currently used immunosuppressants include cyclosporine A and FK506, which are compounds derived from natural products with complex chemical structures. However, they are uneconomical due to high costs due to raw material supply and demand and have a risk of causing side effects due to long-term administration. Therefore, there is an urgent need to develop a new immunosuppressant that may be economically produced with low toxicity and immune tolerance induction.

Meanwhile, T cells are one of the cell groups that play a central role in the immune system as a biological defense system against various pathogens. T cells are generated in the thymus of the human body. By a series of differentiation processes, they differentiate into T cells with unique characteristics. T cells that have completed differentiation are largely classified into type 1 helper cells (Th1) and type 2 helper cells (Th2) according to their functions. Among these, the main function of Th1 cells are involved in cell-mediated immunity, and Th2 cells are involved in humoral immunity. In the immune system, these two cell populations maintain the balance of the immune system by checking each other so that they do not over-activate each other.

Therefore, it may be seen that most immune diseases are caused by the imbalance between these two immune cells. It is known that, for example, if the activity of Th1 cells is abnormally increased, autoimmune diseases may occur. If the activity of Th2 cells is abnormally increased, immune diseases caused by hypersensitivity reactions occur.

Meanwhile, the results of a recent study on the differentiation of Th1 cells indicate the existence of a new group of immunoregulatory T cells (Tregs) that may regulate the activity of Th1 cells. Thus, research on the treatment of immune diseases using these cells is on the rise. Many studies are being conducted to treat immune diseases by increasing the activity of Treg cells because Treg cells have the property of suppressing the function of abnormally activated immune cells to regulate the inflammatory response.

Further, in addition to Treg cells, there are Th17 cells as still another group generated during the differentiation process of T cells. Th17 cells are known to be formed through a process similar to the differentiation of Treg cells in the differentiation process of undifferentiated T cells. That is, Treg cells and Th17 cells are differentiated in the presence of TGF-β in common, but Treg cells do not require IL-6, whereas Th17 cells are differentiated in a situation where IL-6 is present together with TGF-β. In addition, differentiated Th17 cells are characterized in that they secrete IL-17.

It has been found that Th17 cells, unlike Treg cells, are involved in the forefront of the inflammatory response shown in immune diseases to maximize the inflammatory response signal, thereby accelerating disease progression. Therefore, the development of therapeutic agents for the autoimmune diseases has been highlighted to target the inhibition of Th17 cell activity for autoimmune diseases that are not regulated by Treg cells among autoimmune diseases.

Currently, most used immunosuppressants are the ones to block the signal transduction pathway in T cells, as the therapeutic agents for the immune diseases. However, these immunosuppressants have a problem of side effects such as toxicity, infection, lymphoma, diabetes, tremor, headache, diarrhea, hypertension, nausea, and renal dysfunction.

Further, in addition to the method of treating immune diseases by the inhibition method of the activation of T cells, a treatment method that controls the number of cytokines secreted from immune cells and antibodies targeting cytokines secreted from immune cells are under development. However, these methods have a problem in that it takes a lot of time to be applied to patients after a clinical trial, and the method using an antibody costs too much in the antibody production process.

DISCLOSURE

Technical Problem

An object of the present invention is to provide a recombinant peptide in which mitochondria localization sequence (MLS) peptide and signal transducer and activator of transcription 3 (STAT3) are fused.

Another object of the present invention is to provide a recombinant vector comprising a polynucleotide encoding the recombinant peptide.

Still another object of the present invention is to provide a composition for preventing or treating autoimmune diseases or inflammatory diseases, the composition comprising the recombinant peptide or the recombinant vector as an active ingredient.

Yet another object of the present invention is to provide a method for preventing or treating an autoimmune disease or inflammatory disease, the method comprising administering to an individual an effective amount of the recombinant peptide or the recombinant vector.

Technical Solution

In order to achieve the above object, the present invention provides a recombinant peptide in which mitochondria localization sequence (MLS) peptide and signal transducer and activator of transcription 3 (STAT3) are fused.

In an example of the present invention, the recombinant peptide may comprise the amino acid sequence represented by SEQ ID NO: 1.

Further, the present invention provides a recombinant vector comprising a polynucleotide encoding the recombinant peptide.

In an example of the present invention, the polynucleotide may comprise the base sequence represented by SEQ ID NO: 2.

Further, the present invention provides a composition for preventing or treating autoimmune diseases or inflammatory diseases, the composition comprising the recombinant peptide or the recombinant vector as an active ingredient.

In an example of the present invention, the autoimmune disease or inflammatory disease may be selected from the group consisting of rheumatoid arthritis, asthma, dermatitis, psoriasis, cystic fibrosis, multiple sclerosis, encephalomyelitis, systemic lupus erythematosus, Sjogren syndrome, Hashimoto thyroiditis, polymyositis, scleroderma, Addison disease, vitiligo, pernicious anemia, glomerulonephritis, pulmonary fibrosis, inflammatory bowel diseases, autoimmune diabetes, diabetic retinopathy, rhinitis, ischemia-reperfusion injury, post-angioplasty restenosis, chronic obstructive pulmonary diseases (COPD), Graves disease, gastrointestinal allergies, conjunctivitis, atherosclerosis, coronary artery disease, angina, and arteriole disease.

In an example of the present invention, the recombinant peptide or the recombinant vector may overexpress STAT3 in mitochondria.

In an example of the present invention, the recombinant peptide or the recombinant vector may inhibit the expression of the inflammatory cytokine IL-17.

In an example of the present invention, the composition may be administered parenterally.

In an example of the present invention, the composition may be administered intravenously, intramuscularly, subcutaneously, or intra-articularly.

Further, the present invention provides a method for preventing or treating an autoimmune disease or inflammatory disease, the method comprising administering to an individual an effective amount of the recombinant peptide or the recombinant vector.

Advantageous Effects

The composition according to the present invention overexpresses STAT3 in mitochondria to inhibit the expression of inflammatory cytokines including IL-17, and it thus may be useful for the prevention or treatment of autoimmune diseases or inflammatory diseases.

DESCRIPTION OF DRAWINGS

FIG. 2B shows specific amino acid sequence information of the MLS-mouse STAT3 recombinant vector (SEQ ID NO: 1).

FIG. 3 shows the results of measuring the expression level of STAT3 in mitochondria through western blotting after introducing a Mock (M), WT-STAT (W) or MLS-STAT3 (MS) recombinant vector into HEK293 cells.

FIG. 13 shows the results of confirming Th17 inhibition, Treg regulation, inflammatory macrophage control, and anti-inflammatory macrophage increase in MLS-STAT3 overexpressing mice by flow cytometry.

FIG. 19A shows a cleavage map of the MLS-human STAT3 recombinant vector.

FIG. 19B shows the results of measuring the expression level of STAT3 in mitochondria through Western blotting after introducing a Mock (M) or MLS-STAT3 (MS) recombinant vector into human NIH3T3 cells.

FIG. 19C shows the results of analyzing the expression level of pMLKL through Western blotting after introducing a Mock (M) or MLS-STAT3 (MS) recombinant vector into human NIH3T3 cells.

FIG. 20B shows specific amino acid sequence information of the MLS-human STAT3 recombinant vector (SEQ ID NO: 3).

BEST MODES OF THE INVENTION

Figures 1, 2A:
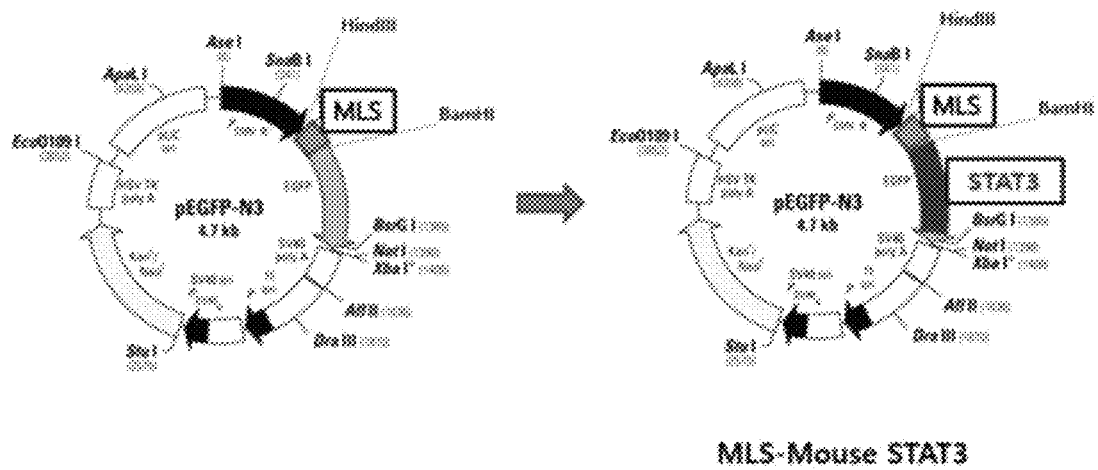
FIG. 1 shows a cleavage map of the MLS-mouse STAT3 recombinant vector.
FIG. 2A shows specific DNA sequence information of the MLS-mouse STAT3 recombinant vector (SEQ ID NO: 2).

The present invention relates to a recombinant peptide in which mitochondria localization sequence (MLS) peptide and signal transducer and activator of transcription 3 (STAT3) are fused; a recombinant vector comprising a polynucleotide encoding the recombinant peptide; and a composition for preventing or treating an autoimmune disease or an inflammatory disease, the composition comprising the recombinant peptide or the recombinant vector.

The recombinant peptide of the present invention may comprise the amino acid sequence represented by SEQ ID NO: 1 and includes a functional equivalent to the polypeptide comprising the amino acid sequence represented by SEQ ID NO: 1.

The term "functional equivalent" means that, as a result of addition, substitution or deletion of amino acid residues, it has an amino acid sequence with at least 70%, preferably, at least 80%, more preferably, at least 90%, and more preferably, at least 95% sequence homology with the amino acid sequence that is represented by SEQ ID NO: 1, thus indicating a protein which has substantially the same physiological activity as the protein consisting of the amino acid sequence represented by SEQ ID NO: 1. The "substantially the same activity" means the activity of the MLS-STAT3. The functional equivalent may include, for example, an amino acid sequence variant in which some of the amino acids of the amino acid sequence according to the present invention are substituted, deleted, or added. The substitution of amino acids may preferably be conservative substitutions, and examples of conservative substitutions of naturally occurring amino acids are as follows; aliphatic amino acids (Gly, Ala, Pro), hydrophobic amino acids (Ile, Leu, Val), aromatic amino acids (Phe, Tyr, Trp), acidic amino acids (Asp, Glu), basic amino acids (His, Lys, Arg, Gln, Asn) and sulfur-containing amino acids (Cys, Met). Deletion of amino acids may preferably be located at a portion not directly involved in the activity of the recombinant peptide of the present invention.

The polynucleotide encoding the recombinant peptide of the present invention is introduced into an expression vector such as a plasmid or a viral vector by a known method, and then the expression vector may be introduced into the target cell in expression type through transduction or transfection by various methods known in the art.

The gene transfer method using a plasmid expression vector is a method of directly transferring plasmid DNA to human cells and may be used in humans which is a method approved by the FDA (Nabel, E G et al, Science, 249:1285-1288, 1990). Unlike viral vectors, plasmid DNA has the advantage that it may be purified to homogeneity. A plasmid expression vector that may be used in the present invention may include a mammalian expression plasmid known in the art.

The plasmid expression vector including the nucleic acid according to the present invention may be introduced into the target cell by methods known in the art, for example, transient transfection, microinjection, transduction, cell fusion, calcium phosphate precipitation, liposome-mediated transfection, DEAE Dextran-mediated transfection, polybrene-mediated transfection, electroporation, a gene gun and other known methods for introducing DNA into the cell, but is not limited thereto (Wu et al, J Bio Chem, 267:963-967, 1992; Wu et al, Bio Chem, 263:14621-14624, 1988).

In addition, the vector may be administered to cells, tissues or the body by a known method, for example, it may be administered topically, parenterally, nasally, intravenously, intramuscularly, subcutaneously or by other suitable means. In particular, the vector may be directly injected in an amount effective to treat a target tissue or target cell.

The composition according to the present invention may be used as a pharmaceutical composition capable of preventing and treating autoimmune diseases or inflammatory diseases, and the pharmaceutical composition may further include a pharmaceutically acceptable carrier. As used herein, "pharmaceutically acceptable" refers to a composition that is physiologically acceptable and does not normally cause allergic reactions or similar reactions such as gastrointestinal disorders and dizziness when administered to humans. Pharmaceutically acceptable carriers include, for example, carriers for oral administration such as lactose, starch, cellulose derivatives, magnesium stearate and stearic acid and carriers for parenteral administration such as water, suitable oils, saline, aqueous glucose and glycols and may further include a stabilizer and a preservative. Suitable stabilizers include antioxidants such as sodium hydrogen sulfite, sodium sulfite or ascorbic acid. Suitable preservatives include benzalkonium chloride, methyl- or propylparaben and chlorobutanol. Other pharmaceutically acceptable carriers may include reference described in the following literature (Remington's Pharmaceutical Sciences, 19th ed, Mack Publishing Company, Easton, PA, 1995).

The pharmaceutical composition according to the present invention may be formulated in a suitable form according to a method known in the art together with a pharmaceutically acceptable carrier as described above. In other words, the pharmaceutical composition of the present invention may be prepared in various parenteral or oral dosage forms according to known methods. A representative formulation for parenteral administration preferably includes an isotonic aqueous solution or suspension as formulations for injection. Formulations for injection may be prepared according to techniques known in the art using suitable dispersing agents, wetting agents or suspending agents. For example, each component may be dissolved in saline or buffer to be formulated for injection. In addition, formulations for oral administration include, but are not limited to, powders, granules, tablets, pills and capsules.

In addition, the present invention provides a method for preventing or treating an autoimmune disease or inflammatory disease, the method comprising administering an effective amount of the recombinant peptide or the recombinant vector to an individual.

The treatment method of the present invention comprises administering the recombinant peptide or the recombinant vector to an individual in a therapeutically effective amount. A specific therapeutically effective amount for a particular individual preferably depends on various factors including the type and extent of the response to be achieved and whether other agents are used, if necessary as well as the specific composition, the subject's age, weight, general health condition, gender and diet, the time of administration, the route of administration and secretion rate of the composition, the duration of treatment, and the drug used together with or simultaneously with the specific composition and similar factors well known in the pharmaceutical field. The daily dose is 0.0001 mg/kg to 100 mg/kg, preferably 0.01 mg/kg to 100 mg/kg, based on the amount of the pharmaceutical composition of the present invention, and may be administered 1 to 6 times a day. However, it is obvious to those skilled in the art that the dose or dosage of each active ingredient should be such that the content of each active ingredient is too high to cause side effects. Therefore, it is preferable to determine the effective amount of the composition suitable for the purpose of the present invention in consideration of the above description.

The individual may include any mammal, and the mammal includes not only humans and primates, but also domestic animals such as cattle, pigs, sheep, horses, dogs and cats.

The recombinant peptide or recombinant vector of the present invention may be administered to mammals such as rats, mice, livestock, and humans by various routes. Any mode of administration may be envisaged, for example, by oral, rectal, or intravenous, intramuscular, subcutaneous, intrauterine dural or intracerebroventricular injection.

Hereinafter, the present invention is described in more detail through Examples. These Examples are for explaining the present invention in more detail, and the scope of the present invention is not limited to these Examples.

Example 1. Construction of Mitochondria Localization Sequence-Signal Transducer and Activator of Transcription 3 (MLS-STAT3) Overexpression Recombinant Vector and Confirmation of the Overexpression In order to construct a vector in which STAT3 moves into mitochondria to be expressed (hereinafter referred to as "MLS-STAT3"), the restriction enzyme site of BamHI-NotI was cut in pEGFP-N3 vector, which is a GFP vector having a mitochondria localization sequence (MLS) sequence, and then the DNA sequence of mouse STAT3 was inserted into the site. The cleavage map of the recombinant vector of MLS-mouse STAT3 overexpression is shown in FIG. 1, and the DNA sequence information and amino acid sequence information of the recombinant vector of MLS-mouse STAT3 overexpression are shown in FIG. 2.

Thereafter, in order to check whether the produced MLS-STAT3 is overexpressed in mitochondria, the present inventors introduced the prepared recombinant vector into HEK293 cells and isolated the mitochondria of the introduced cells. Then the experiment was performed to confirm the expression of STAT3 through Western blotting. As a result, it was confirmed that STAT3 was overexpressed in the mitochondria of HEK293 cells into which the MLS-STAT3 recombinant vector was inserted, which was significantly more expressed than when the control (Mock) or STAT3 recombinant vector without MLS sequence (WT-STAT3) was inserted (FIG. 3).

Figure 4:
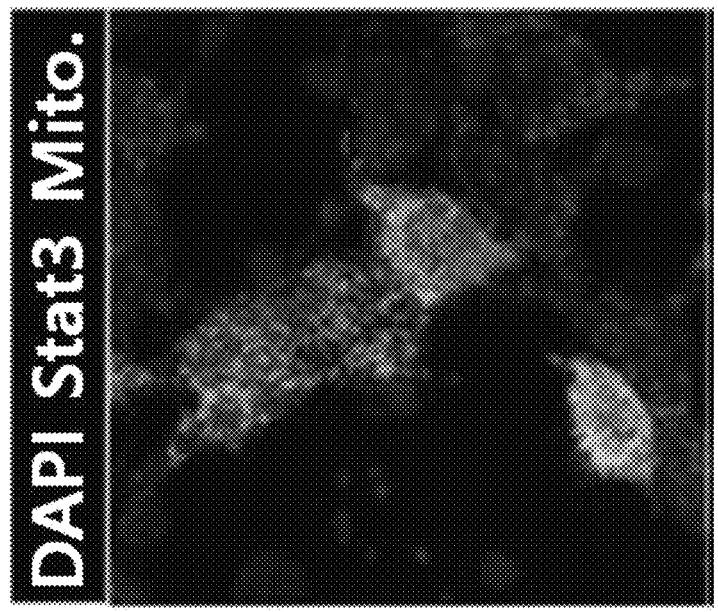
FIG. 4 shows the results of confirming the expression of STAT3 in mitochondria through confocal analysis after introducing the MLS-STAT3 recombinant vector into HEK293 cells.

In addition, the present inventors performed a confocal analysis to determine whether MLS-STAT3 is overexpressed in the mitochondria of HEK293 cells. As a result, it was confirmed that STAT3 was overexpressed in the mitochondria of HEK293 cells in the case in which the MLS-STAT3 recombinant vector was inserted into HEK293 cells (FIG. 4).

Example 2. Therapeutic Effect on Rheumatoid Arthritis by MLS-STAT3 Overexpression Recombinant Vector In order to confirm the therapeutic effect of the MLS-STAT3 overexpression of recombinant vectors on rheumatoid arthritis, the present inventors performed an experiment to analyze the therapeutic effect after injecting the vector into an animal model induced with rheumatoid arthritis. In brief, a mouse animal model in which collagen-induced arthritis (CIA) was induced by injection of Type II collagen into DBA1/J mice was prepared. Mock or MLS-STAT3 recombinant vector was transferred to the mouse 1 week after induction of arthritis. It was injected weekly (100 µg) for 11 weeks by electroporation. Then, the arthritis score and the incidence of arthritis were analyzed. Arthritis evaluation criteria are as follows.

Figure 5:
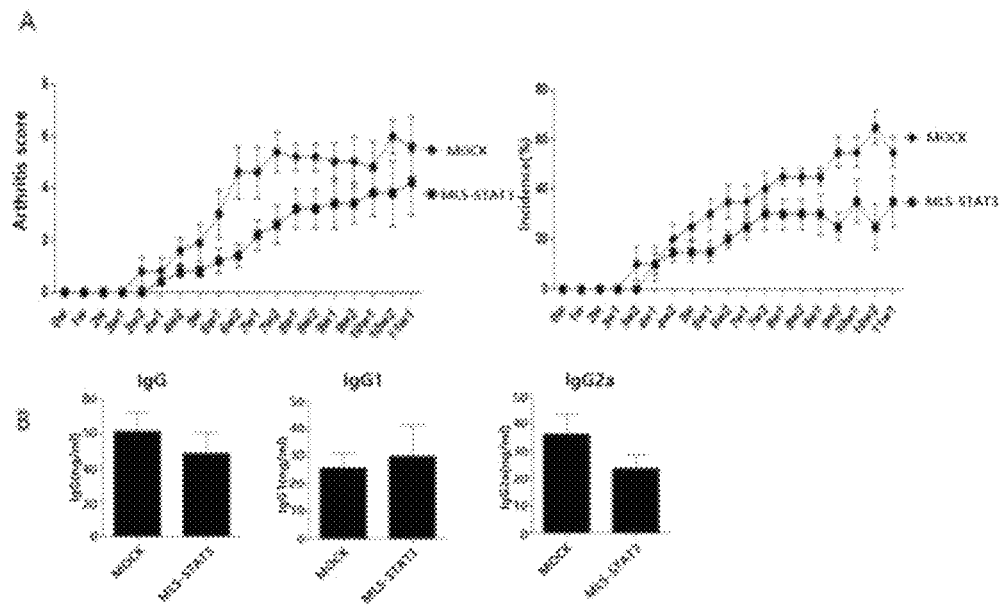
FIG. 5A shows the results of analyzing an arthritis score and an incidence of arthritis after injecting a Mock or MLS-STAT3 recombinant vector into an arthritis-induced mouse.
FIG. 5B shows the results of analyzing the expression levels of IgG, IgG1, and IgG2a through ELISA after injecting a Mock or MLS-STAT3 recombinant vector into an arthritis-induced mouse and then separating the mouse serum.

—Evaluation Criteria—
 0 points: No edema or swelling.
 1 point: Mild edema and skin flare limited to the foot or ankle joint
 2 points: Mild edema and skin flare from the ankle joint to the metatarsal
 3 points: Moderate edema and skin flare from the ankle joint the metatarsal
 4 points: Edema and skin flare from the ankle to the entire leg
 5 or more points: Continued severe edema and skin flare As a result, it was confirmed that the arthritis index in the group in which the MLS-STAT3 recombinant vector was injected into the arthritis-induced mouse was significantly lower than that of the control group (Mock), and the degree of arthritis incidence was also significantly lower than that of the control group (FIG. 5A).

Therefore, it was confirmed that rheumatoid arthritis could be treated by the MLS-STAT3 recombinant vector.

Example 3. Effect on Antibody Modulation by MLS-STAT3 Overexpression Recombinant Vector The present inventors performed an experiment to determine whether the MLS-STAT3 overexpression recombinant vector had antibody modulating effect in the rheumatoid arthritis-induced animal model. Briefly, blood was collected from the arthritis-induced mouse used in Example 2, and serum was separated again. The expression levels of IgG, IgG1 and IgG2a were analyzed by ELISA.

As a result, the expression of IgG in mice injected with the MLS-STAT3 recombinant vector was reduced compared to the control group (Mock). The expression of IgG1 related to the Th2 response was slightly increased, and the expression of IgG2a related to the Th1 response was decreased (FIG. 5B).

Therefore, in the group injected with the MLS-STAT3 recombinant vector, the anti-inflammatory antibody such as Th2 was increased, and the production of inflammatory antibodies such as Th1 was suppressed. Thus, the results indicate that rheumatoid arthritis may be treated.

Example 4. Inhibitory Effect on Cartilage Damage in Rheumatoid Arthritis by MLS-STAT3 Overexpression Recombinant Vector The present inventors performed an experiment to determine whether the MLS-STAT3 overexpression recombinant vector has the effect of inhibiting cartilage damage in an animal model induced with rheumatoid arthritis. Briefly, joint tissues obtained from arthritis-induced mice were fixed with 10% formalin. After the bones were decalcified, the tissues were embedded in paraffin. Then, the tissues were made into 7 μm-thick sections and attached to slides. Thereafter, H&E staining and Safranin O staining were performed, and the degree of bone damage and the degree of cartilage damage were analyzed through an optical microscope.

Figure 6:
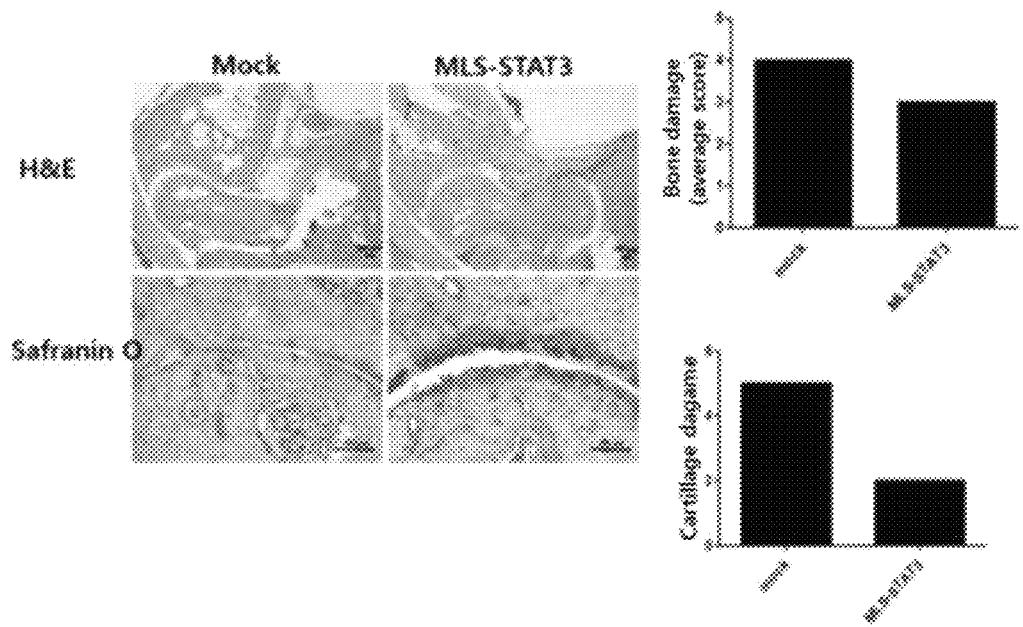
FIG. 6 shows the results of analyzing the degree of bone damage and the degree of cartilage damage through H&E staining and Safranin 0 staining after injecting a Mock or MLS-STAT3 recombinant vector into an arthritis-induced mouse.

As a result, it was confirmed that the group in which the MLS-STAT3 recombinant vector was injected into arthritis-induced mice, the degree of bone damage was lowered to about 75% compared to the control group (Mock), and the degree of cartilage damage was significantly lowered to about 40% (FIG. 6).

Therefore, it was confirmed that the MLS-STAT3 recombinant vector could be injected to inhibit cartilage damage, thereby treating rheumatoid arthritis.

Example 5. Inhibitory Effect on Inflammatory Cytokine Expression in Joint by MLS-STAT3 Overexpression Recombinant Vector The present inventors performed an experiment to determine whether the MLS-STAT3 overexpression recombinant vector changes inflammatory cytokines in the joint in an animal model induced with rheumatoid arthritis. Briefly, immunohistochemical staining was performed on joint tissues obtained from arthritis-induced mice to analyze the expression levels of inflammatory cytokines IL-17, TNF-α, IL-6 and IL-1β.

Figure 7:
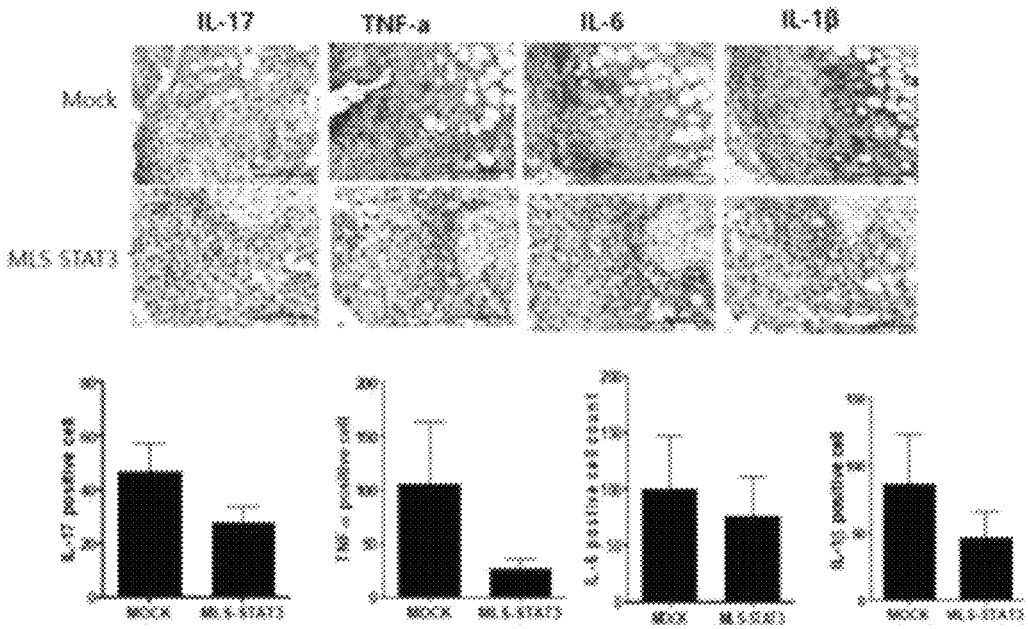
FIG. 7 shows the results of analyzing the expression level of IL-17, TNF-α, IL-6 and IL-1β through immunohistochemical staining after injecting a Mock or MLS-STAT3 recombinant vector into an arthritis-induced mouse.

As a result, it was confirmed that the expression levels of IL-17, TNF-α, IL-6 and IL-1β in the group in which the MLS-STAT3 recombinant vector was injected into the arthritis-induced mice were significantly reduced compared to the control group (Mock) (FIG. 7).

Therefore, it was confirmed that the MLS-STAT3 recombinant vector could be injected to reduce the expression level of inflammatory cytokines, thereby treating rheumatoid arthritis.

Example 6. Effect of Reducing the Expression of Mitochondrial Genes by IL-17, an Inflammatory Cytokine The present inventors performed an experiment to confirm whether IL-17, an inflammatory cytokine, has an effect related to the function and activity of mitochondria. First, after fibroblast-like synoviocyte (FLS) cells were treated with IL-17, the expression levels of mitochondrial genes CYCS (Cytochrome C, Somatic), COX5B (cytochrome c oxidase subunit 5B) and ATP50 (ATP synthase subunit 0) were analyzed by qPCR.

As a result, it was confirmed that the expression level of the mitochondrial gene in the group treated with IL-17 was reduced compared to the control group (Nil), and the expression level of the mitochondrial gene in the group treated with IL-17 with ROS induction by $H_2O_2$ was further reduced. (FIG. 8A).

In addition, in order to analyze whether necroptosis is induced in rheumatoid arthritis (RA)-derived FLS cells by IL-17, osteoarthritis (OA)-derived FLS cells (control group) or RA-derived FLS cells were treated with IL-17, and then flow cytometry was performed by PI/Annexin V staining.

Figure 8:
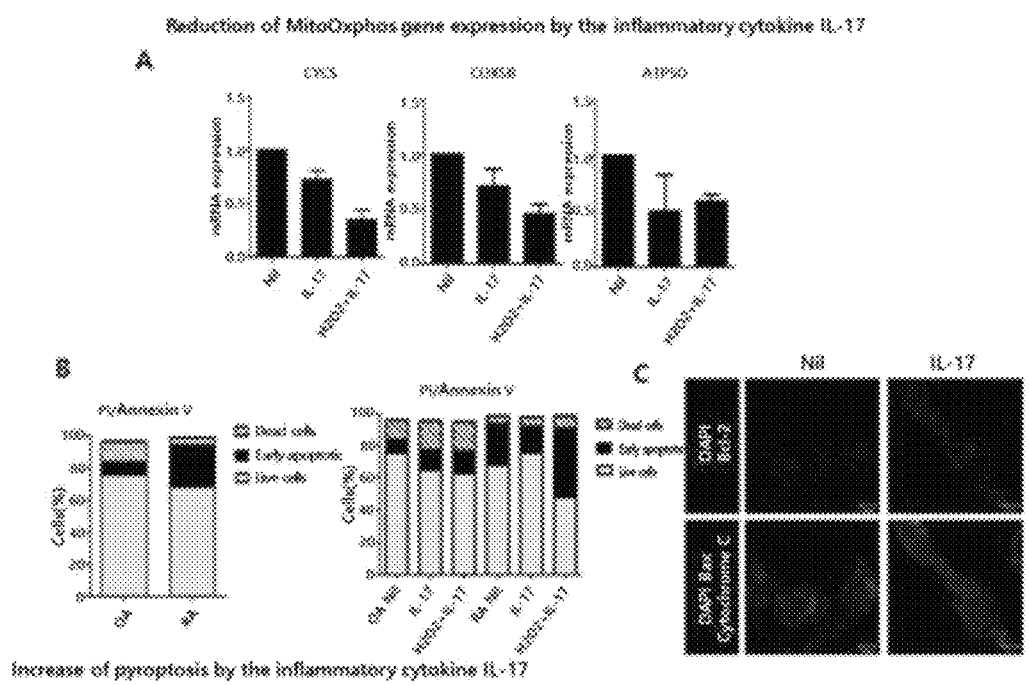
FIG. 8A shows the results of analyzing the expression level of CYCS (Cytochrome C, Somatic), COX5B (cytochrome c oxidase subunit 5B) and ATP5O (ATP synthase subunit O) through qPCR after treating FLS cells with IL-17 or $H_2O_2$+IL-17.
FIG. 8B shows the results of analyzing the degree of apoptosis through PI/Annexin V staining after treating osteoarthritis (OA)-derived FLS cells or rheumatoid arthritis (RA)-derived FLS cells with IL-17 or $H_2O_2$+IL-17.
FIG. 8C shows the results of analyzing the expression of Bcl2 through a confocal analysis after treating FLS cells with IL-17.

As a result, it was confirmed that early apoptotic inflammatory cells in RA-derived FLS cells treated with IL-17 were significantly increased compared to OA-derived FLS cells, control group, and the number of early apoptotic cells in RA-derived FLS cells treated with IL-17 under $H_2O_2$ oxidative stress was specifically increased (FIG. 8B). It was confirmed that the early apoptotic cells were necroptosis-induced cells, and IL-17 induced necroptosis, which is inflammatory cell death (pyroptosis) in RA-derived FLS cells. In addition, the confocal analysis confirmed that the treatment with IL-17 activates Bcl2, which is the anti-apoptotic factor (FIG. 8C).

Therefore, it was confirmed that IL-17, an inflammatory cytokine, inhibits the expression of mitochondrial genes and increases the death of inflammatory cells but inhibits the death of normal cells.

Example 7. Confirmation of Th17 Cell Activity Regulation and Treg Cell Activity by MLS-STAT3 Overexpression Recombinant Vector It is known that Th17 cells accelerate the disease caused by inflammatory diseases. Thus, it was confirmed whether the MLS-STAT3 overexpression vector of the present invention inhibits the activity of Th17. In addition, it is known that Treg cells that differentiate in an environment similar to that in which Th17 differentiates regulate Th1 cells to inhibit inflammation. Thus, it was also confirmed that the activity of Treg cells was increased by the MLS-STAT3 overexpression vector. To confirm the regulation of Th17 and Treg activity and STAT3 migration in mitochondria, mouse splenocytes were collected from arthritis-induced mice 11 weeks after arthritis induction. The cells were stained with FITC-conjugated anti-CD4, PE-conjugated anti-forkhead box P3 (Foxp3), APC-conjugated anti-CD25, FITC-conjugated anti-CD4, PE-conjugated anti-IL-17 and FITC-conjugated anti-CD4, PE-conjugated anti-pSTAT3(5727), APC-conjugated anti-COX4 (eBiosciences, San Diego, CA, USA).

Stained sections were visualized using a Zeiss microscope (LSM 510 Meta; Carl Zeiss, Oberkochen, Germany).

Figure 9:
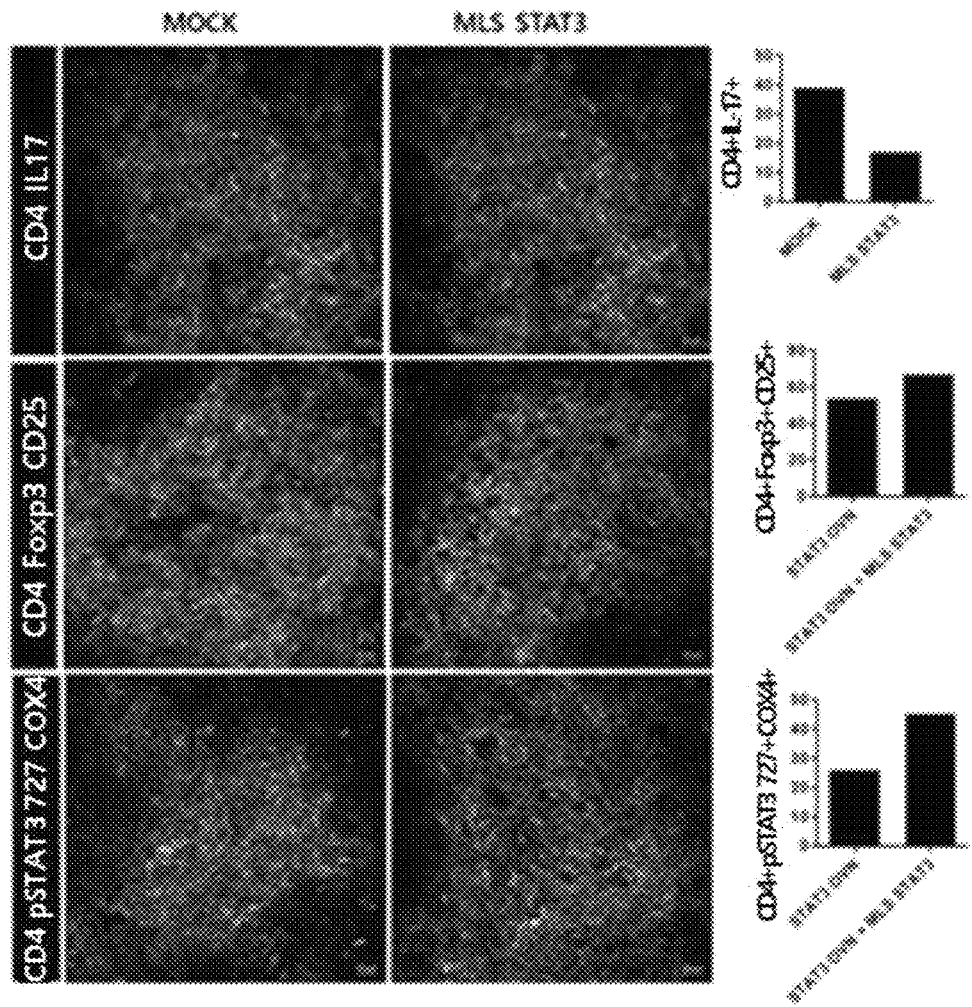
FIG. 9 shows the results of the co-regulation of IL-17, which is Th17 activators, and Treg activators and the movement of pSTAT3 727 in mitochondria by MLS-STAT3 overexpression. (Control group: MOCK, experimental group: MLS STAT3).

As a result, it was found that the expression of the etiological Th17 (CD4+IL-17+) was significantly decreased compared to the control group, while the expression of Treg (CD4+CD25+Foxp3+) cells that induce an immunosuppressive response was increased, which could have an arthritis treatment effect (FIG. 9). In addition, it was confirmed that the migration of pSTAT3 727 in the mitochondria is increased. It was confirmed that rheumatoid arthritis was controlled by the improved mitochondrial function by the migration of pSTAT 727 into the mitochondria.

Example 8. Confirmation of Control of Synovial Tissue Cell Death by MLS-STAT3 Overexpression Recombinant Vector

Example 8-1. Confirmation of Control of Pyroptosis by MLS-STAT3 Overexpression Recombinant Vector In order to confirm whether the MLS-STAT3 overexpression vector of the present invention controls pyroptosis of synovial tissue, synovial tissue collected from mice was treated with RIP1, RIP3 and pMKL to induce pyroptosis. The synovial tissue induced by pyroptosis was treated with an MLS-STAT3 overexpression vector, fixed with 10% formalin, embedded in paraffin, then made into 7 μm-thick sections and attached to slides. Thereafter, H&E staining was performed, and pyroptosis of the synovial tissue was analyzed through an optical microscope.

Figure 10:
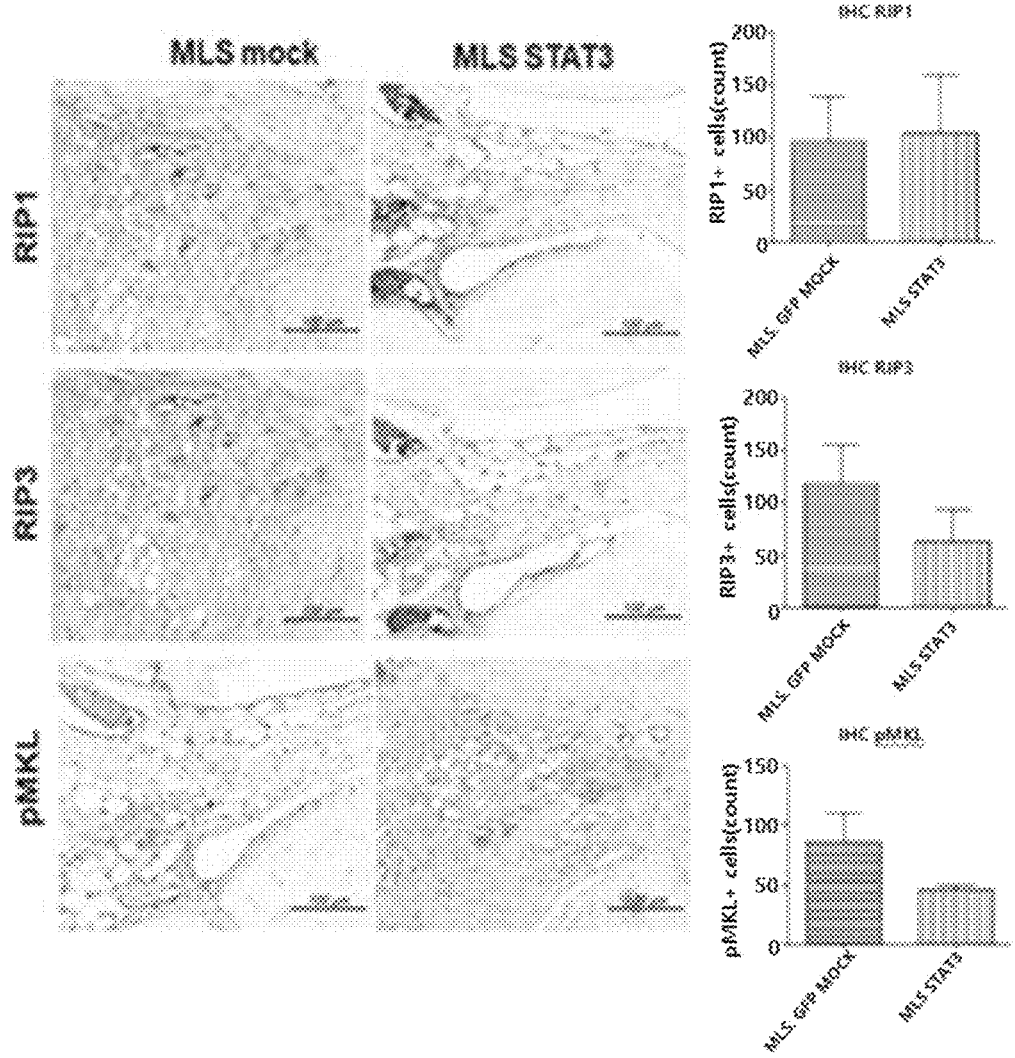
FIG. 10 shows the results of confirming the regulation of factors related to inflammatory cell death (pyroptosis) of synovial tissue (control group: MLS moc1, experimental group: MLS STAT3).

As a result, as shown in FIG. 10, it was confirmed that the pyroptosis induced by RIP1, RIP3 and pMKL was regulated in the synovial tissue treated with the MLS-STAT3 overexpression vector.

Example 8-2. Confirmation of Increase in Normal Apoptosis by MLS-STAT3 Overexpression Recombinant Vector Normal apoptosis is one in series of treatment processes for arthritis. In order to confirm whether the MLS-STAT3 overexpression vector of the present invention increases normal apoptosis, the expression of the apoptosis factor BAX in the joint synovium tissue of arthritis-induced mice was tested to perform the tissue analysis. It was confirmed that the BAX apoptosis factor was increased in the joint synovium tissue of the rheumatoid arthritis animal model injected with the MLS-STAT3 overexpression vector.

Figure 11:
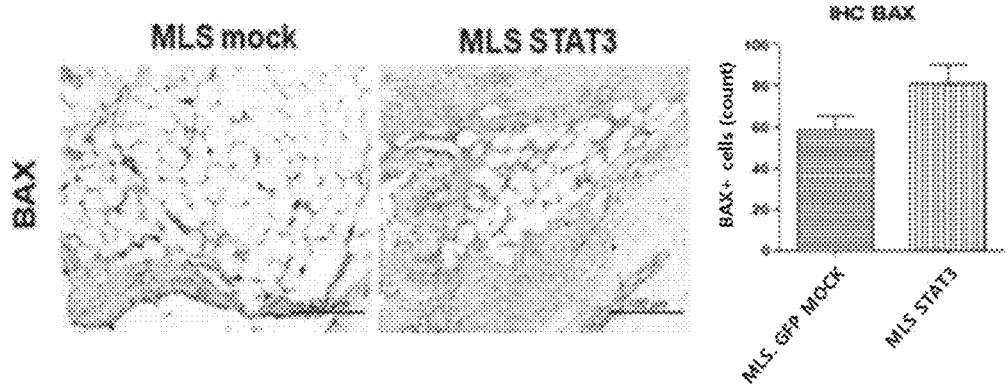
FIG. 11 shows the results of confirming the regulation of normal apoptosis-related factors in synovial tissue (control group: MLS moc1, experimental group: MLS STAT3).

As a result, it was confirmed that normal apoptosis was significantly increased in the mouse joint synovium tissue treated with the MLS-STAT3 overexpression vector compared to that of the control group (FIG. 11).

Example 9. Construction of MLS-Mouse STAT3 Overexpression Vector

Figure 12:
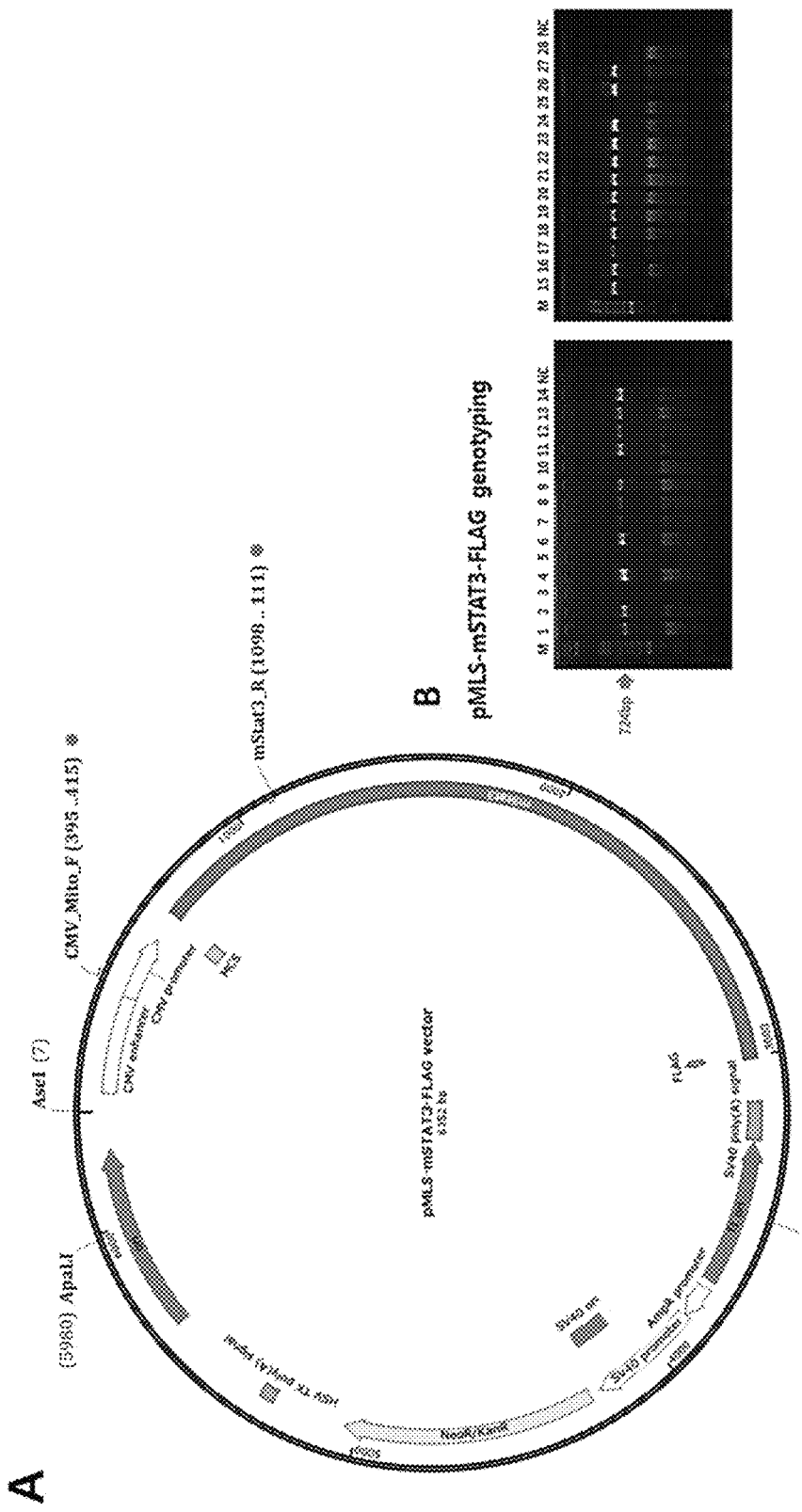
FIG. 12 is a view of showing a cleavage map and genotyping results of a mouse STAT3 overexpression vector (A: a cleavage map of a mouse STAT3 overexpression vector, B: genotyping results).

In order to construct MLS-STAT3 overexpression mice, the present inventors cut the restriction enzyme site of XhoI-NotI from the pCMV/myc/mito vector in which the MLS sequence is included, and then insert the DNA sequence of mouse STAT3 into the MLS-mouse site to construct the MLS-mouse STAT3 overexpression recombinant vector. The cleavage map of the MLS-mouse STAT3 overexpression recombinant vector is shown in FIG. 12.

Example 10. Confirmation of Regulation of Th17 Inhibition and Treg Induction and Etiology-Regulating Macrophage Regulation by MLS-mSTAT3 Overexpression In the splenocytes of the MLS-mSTAT3 overexpressing transgenic mouse prepared in Example 9, the activity regulatory effect of etiology-regulating cells was analyzed. Splenocytes from normal mice and MLS-mSTAT3 overexpressing transgenic mice were obtained and obtained PerCP-conjugated anti-CD4, PE-conjugated anti-forkhead box P3 (Foxp3), APC-conjugated anti-CD25, PerCP-conjugated anti-CD4, FITC-conjugated Anti-IL-17, FITC-conjugated anti-CD11c, and PE-conjugated anti-CD206 were stained for flow cytometry.

As a result, it was confirmed that under the MLS-mSTAT3 overexpression, the activity of Th17 was inhibited, and the activity of Treg (Foxp3) was increased (FIG. 13). In addition, it was confirmed that the activity of etiological macrophage 1 (M1) was inhibited and the expression of anti-inflammatory macrophage 2 (M2) was increased.

Example 11. Confirmation of Effect in Rheumatoid Arthritis Model According to STAT3 Overexpression Induction

Example 11-1. Confirmation of Therapeutic Effect of MLS-mSTAT3 Overexpression Vector on Rheumatoid Arthritis Induced by STAT3

It was confirmed whether the MLS-mSTAT3 overexpression vector of the present invention had a therapeutic effect on rheumatoid arthritis induced by STAT3 overexpression. An animal model induced rheumatoid arthritis was prepared by injecting STAT3 overexpression vector into DBA1/J mice. One week after arthritis induction, the mice injected with a recombined vector with STAT3 OVN alone or with STAT3 OVN and MLS-mSTAT3 by electroporation weekly (100 μg) for 11 weeks. Then, the arthritis score and the incidence of arthritis were analyzed. Arthritis evaluation criteria are as follows.

Figure 14:
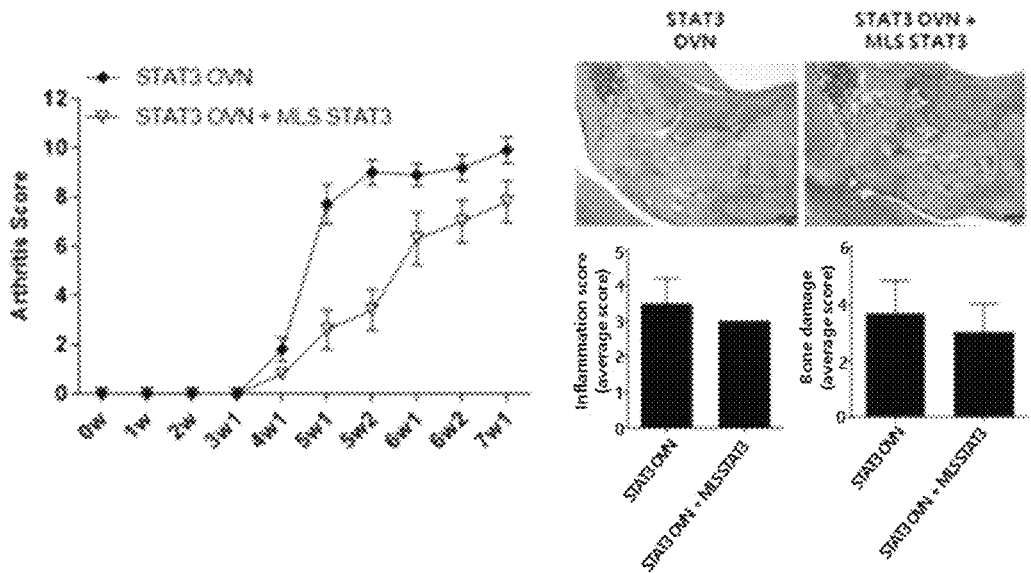
FIG. 14 is a view of confirming the improvement effect of MLS-STAT3 on arthritis index and arthritis onset in rheumatoid arthritis mice induced by STAT3.

—Evaluation Criteria—
- 0 points: No edema or swelling.
- 1 point: Mild edema and skin flare limited to the foot or ankle joint
- 2 points: Mild edema and skin flare from the ankle joint to the metatarsal
- 3 points: Moderate edema and skin flare from the ankle joint the metatarsal
- 4 points: Edema and skin flare from the ankle to the entire leg
- 5 or more points: Continued severe edema and skin flare As a result, it was confirmed that the group in which the MLS-STAT3 recombinant vector was injected into rheumatoid arthritis mice induced by STAT3 had a lower arthritis index compared to the control group, which was treated with STAT3 OVN alone and a lower degree of arthritis incidence compared to the control group, indicating that the MLS-mSTAT3 overexpression vector of the present invention is effective in arthritis induced by STAT3 overexpression (FIG. 14).

Example 11-2. Confirmation of Th17 and Treg Regulatory Effect as Therapeutic Effect of MLS-mSTAT3 Overexpression Vector on Rheumatoid Arthritis Induced by STAT3

It was confirmed whether etiological-regulatory cells could be regulated as the therapeutic effect of the MLSmSTAT3 overexpression vector of the present invention in rheumatoid arthritis induced by STAT3 overexpression. To confirm the regulatory effect on Th17 and Treg, mouse splenocytes were collected on day 35 after arthritis induction. The cells were stained with FITC-conjugated anti-CD4, PE-conjugated anti-forkhead box P3 (Foxp3), APC-conjugated anti-CD25, FITC-conjugated anti-CD4, PE-conjugated anti-IL-17, FITC-conjugated anti-CD4, PE-conjugated anti-pSTAT3(5727), and APC-conjugated anti-COX4 (eBiosciences, San Diego, CA, USA). Stained sections were visualized using a Zeiss microscope (LSM 510 Meta; Carl Zeiss, Oberkochen, Germany).

Figure 15:
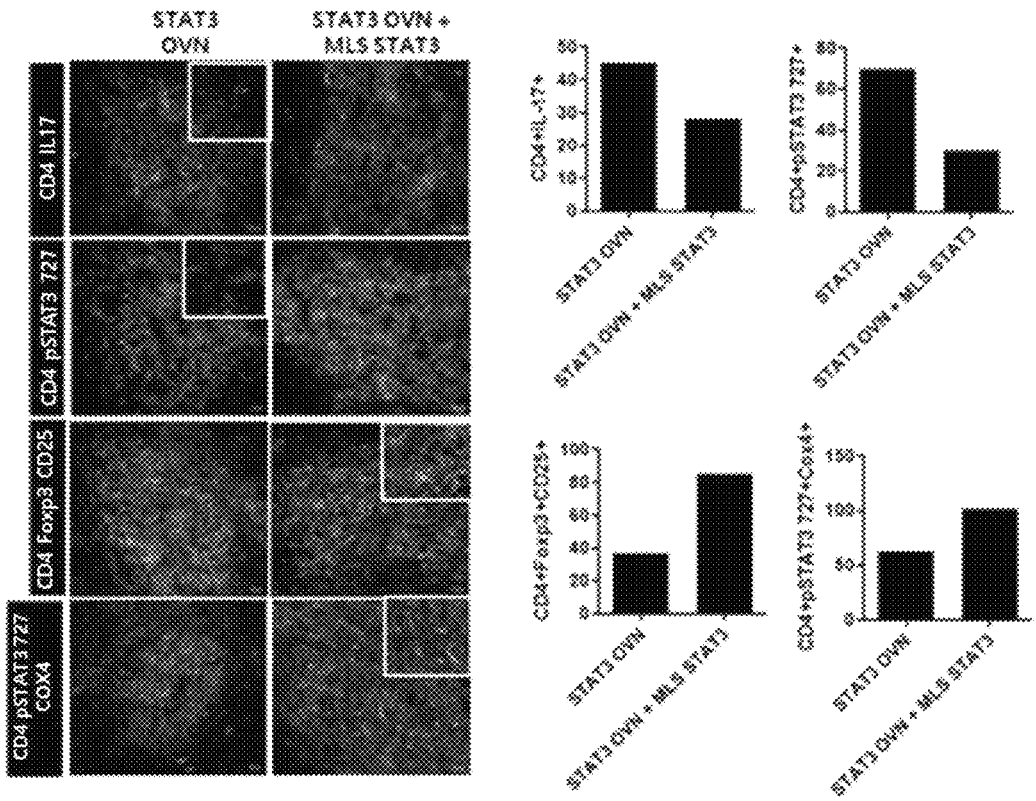
FIG. 15 is a view of confirming the regulation effects of MLS-STAT3 on the Th17 and Treg and migration of pSTAT3 727 into mitochondria in rheumatoid arthritis mice induced by STAT3.

As a result, it was confirmed that the inhibition of etiological Th17 (CD4+IL-17+) cell and the expression of Treg (CD4+CD25+Foxp3+) cells inducing an immunosuppressive response in the splenocytes of mice administered with MLS-mSTAT3 were increased compared to STAT3 overactivity. In addition, it was confirmed that the expression of p-STAT3 727 (CD4+p-STAT3 727+) in the nucleus was decreased compared to the control group, while p-STAT3 727 (CD4+COX4+p-STAT3 727+) in the mitochondria was increased. Therefore, it was confirmed that the movement of STAT3 727 into the mitochondria provides rheumatoid arthritis disease control effects and etiology-regulating immune cells regulatory effects (FIG. 15).

Example 12. Confirmation of Treatment for Inflammatory Bowel Disease in MLS-mSTAT3 Overexpression Transgenic Mice In order to confirm the effect on inflammatory bowel disease in MLS-mSTAT3 overexpression transgenic mice of the present invention, the present inventors prepared a mice model which drank 2.5% dextran sulfate sodium (DSS) water for 1 week to induce inflammatory bowel disease. The mice model was divided into C57BL/6-treated mice as a control group and the MLS-mSTAT3 transgenic group of the present invention. The body weight of each mouse was measured every day to confirm the change in body weight due to inflammatory bowel disease.

Figure 16:
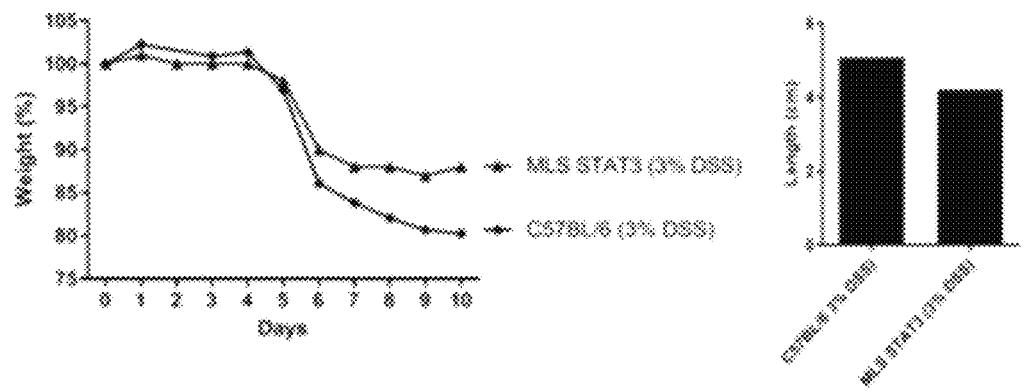
FIG. 16 shows the results of measuring the mouse weight and the length of the intestine in order to confirm the effect of MLS-STAT3 in inflammatory bowel disease-induced mice.

As a result, it may be confirmed that the weight of the control group was decreased rapidly after 5 days of the administration, and the MLS-mSTAT3 transgenic group had no change in weight, and the weight was maintained (FIG. 16).

Example 13. Confirmation of Inhibition of Inflammatory Macrophage M1 in Inflammatory Bowel Disease-Induced MLS-mSTAT3 Transgenic Mouse and Regulation of Anti-Inflammatory Macrophage M2

In order to confirm the effect on macrophages by MLS-mSTAT3 in inflammatory bowel disease, inflammatory macrophages M1 and anti-inflammatory macrophages M2 in lymphocytes were identified. Splenocytes were isolated from the experimental group of mice induced with bowel disease in Experimental Example 12. Then, splenocytes were stained using FITC-conjugated anti-CD11c and PE-conjugated anti-CD206 for flow cytometry analysis.

Figure 17:
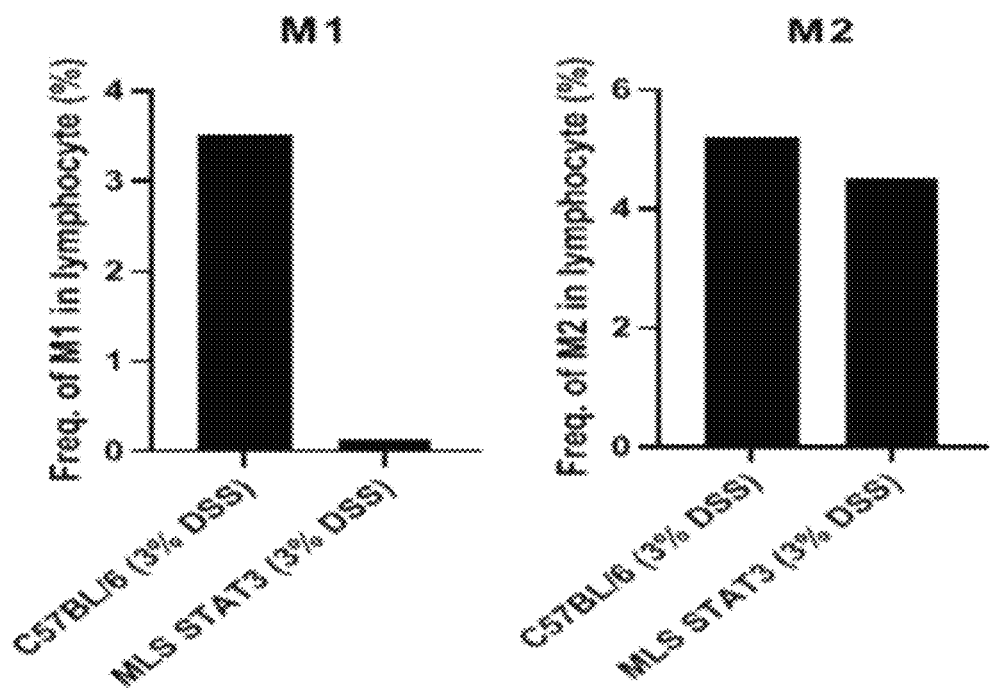
FIG. 17 is a diagram confirming the regulatory effect of MLS-STAT3 inflammatory macrophages M1 and anti-inflammatory macrophages M2 in inflammatory bowel disease-induced mice.

As a result, it was confirmed that the inflammatory macrophage M1 in the MLS-mSTAT3 overexpression transgenic mice of the present invention induced with inflammatory bowel disease was reduced compared to the control group, and the anti-inflammatory macrophage M2 was maintained at a level similar to that of the control group (FIG. 17).

Example 14. Confirmation of EAE Autoantibody Inhibition by MLS-mSTAT3 Gene Injection in Encephalomyelitis Disease (EAE)

MOG-specific encephalomyelitis disease was induced in MLS-mSTAT3 overexpression transgenic mice. After 4 weeks, mouse serum was collected, and the mouse anti-MOG-specific IgG concentration was measured by ELISA method. As controls, C57BL/6 normal mice and EAE-induced C57BL/6 were used. Anti-MOG specific IgG antibody measurement method is as follows. MOG was diluted in 0.05 M sodium carbonate coating buffer (pH 9.6) at a concentration of 4 µg/ml. The diluent was applied to a 96-well microtiter plate and left at 4° C. for 18 hours. After removing the applied solution, 200 µl of TBS (pH 8.0) containing 1% bovine serum albumin (BSA: Amre-sco, solon, Ohio) was added to each well to inhibit non-specific binding. Then, the mixture was reacted at room temperature for 1 hour. For the measurement of anti-MOG specific IgG, the sample was diluted at 1:1,000. As the diluted solution, 1% BAS, 0.05% TBS (pH 8.0) solution containing Tween 20 (Amreco) was used. Next, 50 µl of the diluted serum sample was put into each well and reacted at room temperature for 1 hour. After the reaction was complete, they were washed with TBS solution (pH 8.0) containing 0.05% Tween 20 (Amresco) 5 times, and the detection IgG-HRP conjugate (anti-mouse IgG HRP) was diluted at 1:75,000. Then, 50 µl of the diluent was put in each well. The reaction was carried out at room temperature for 1 hour. After the reaction, after washing three times with washing buffer, color was developed with a TMB+$H_2O_2$ system (KPL, Gaithersburg, MD). Then, the reaction was stopped by adding 1N $H_2SO_4$ in the same amount. These were read as absorbance at 450 nm using an ELISA reader, and the results of antibody measurement were expressed as absorbance itself.

Figure 18:
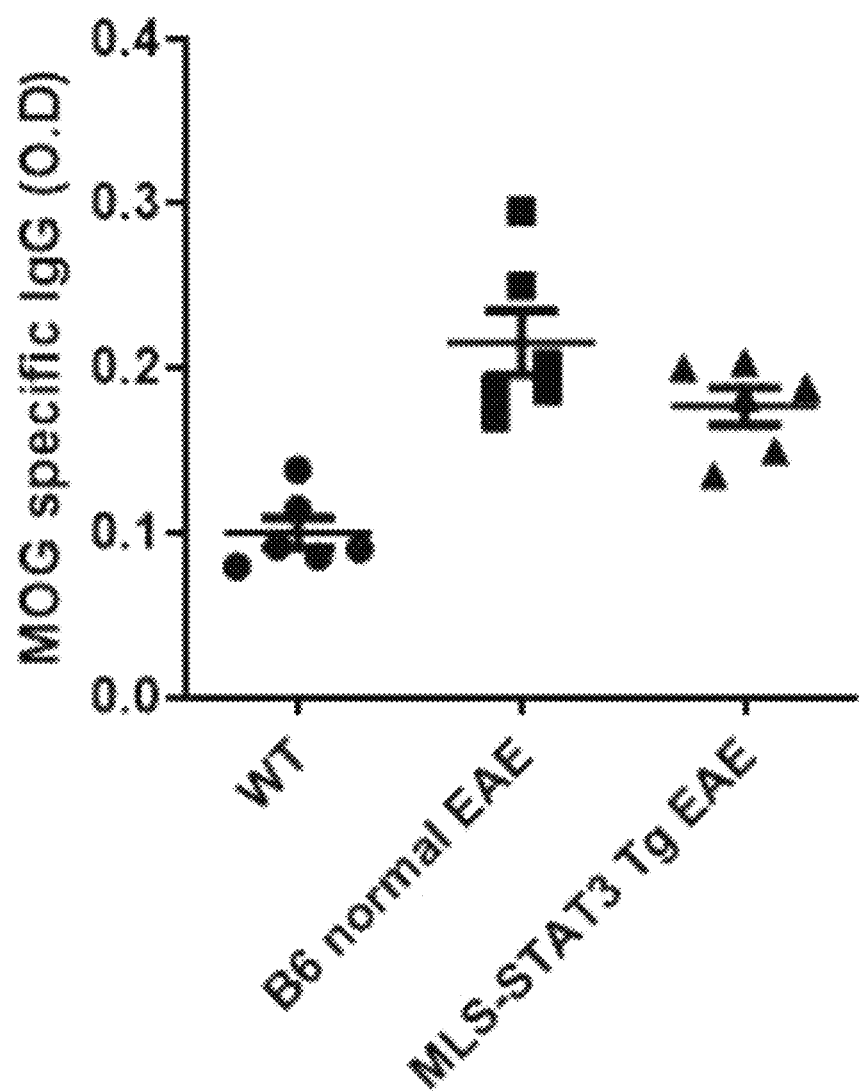
FIG. 18 is a view of confirming the inhibitory effect of MLS-STAT3 on the autoantibody (MOG specific IgG) in encephalomyelitis-induced mice.

As a result, it may be seen that the MOG specific IgG antibody of MLS-mSTAT3 overexpression transgenic mice with encephalomyelitis of the present invention was significantly reduced through the optical density (O.D) value. These results indicate that the MLS-STAT3 of the present invention may effectively inhibit the autoantibody activity reaction (FIG. 18).

Figures 19, 20A:
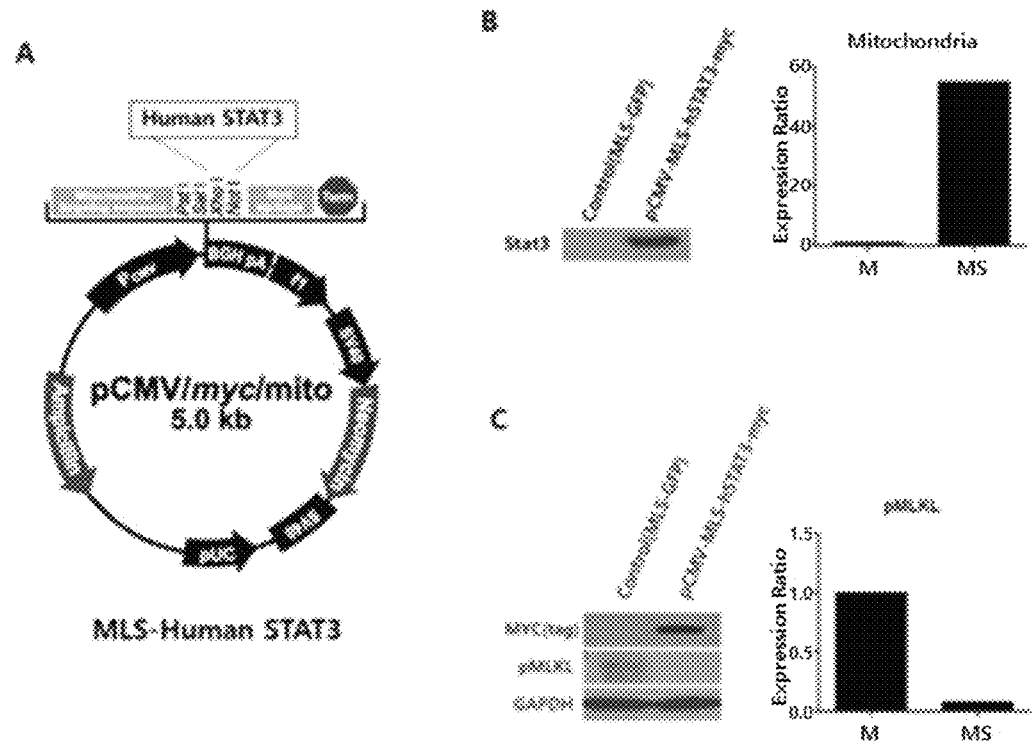
FIG. 20A shows specific DNA sequence information of the MLS-human STAT3 recombinant vector (SEQ ID NO: 4).

Example 15. Construction of MLS-Human STAT3 Overexpression Recombinant Vector and Confirmation of its Overexpression In order to verify the MLS-STAT3 overexpression vector in human cells, the present inventors cut the restriction enzyme site of XhoI-NotI from the pCMV/myc/mito vector including the MLS sequence, and then inserted the DNA sequence of human STAT3 into the site to construct MLS-human STAT3 overexpression recombinant vector. A cleavage map of the MLS-human STAT3 overexpression vector is shown in FIG. 19A, and specific DNA sequence information and amino acid sequence information of the MLS-human STAT3 overexpression vector are shown in FIG. 20.

Then, in order to confirm whether the constructed MLS-human STAT3 overexpression vector is overexpressed in mitochondria, the present inventors introduced the prepared recombinant vector into human-derived NIH3T3 cells. The mitochondria were separated from the introduced cells, and then Western blotting was performed on the mitochondria to confirm the expression of STAT3. As a result, it was confirmed that human STAT3 in the mitochondria of MLS-human STAT3 overexpression vector-introduced NIH3T3 cells was significantly overexpressed compared to the control group (Mock) (FIG. 19B).

In addition, the present inventors performed an experiment after injecting the MLS-human STAT3 overexpression recombinant vector in order to confirm the expression levels of pyroptosis factors, pMLKL (phospho MLKL, mixed lineage kinase domain like pseudokinase) and caspase. As a result, it was confirmed that the MLS-human STAT3 overexpression recombinant vector had an effect of remarkably reducing the expression of pMLKL, a pyroptosis factor (FIG. 19C).

Therefore, it was confirmed that the injection of the MLS-human STAT3 overexpression vector caused reduction of the expression level of the pyroptosis factor so that it may treat rheumatoid arthritis.

Example 16. Restoration of Mitochondrial Function and Regulation of Th17 Cell Activity in T Cells Injected with MLS-Human STAT3 Overexpression Vector In order to confirm whether the MLS-human STAT3 overexpression vector controls mitochondrial function recovery and Th17 cell activity in T cells, PBMCs were isolated from normal blood, and anti-CD3 and anti-CD28 were stimulated in the isolated PBMCs to activate T cells. After T cell activation, MOCK and MLS-human STAT3 overexpression vectors were overexpressed, respectively. After vector expression, JC1 dye was performed for mitochondrial potential analysis, and flow cytometry was performed. In addition, in order to analyze the etiological Th17 cells and Th1 cells, each vector-expressed PBMC was stained with PerCP-conjugated anti-CD4, PE-conjugated anti-IL-17, and FITC-conjugated anti-IFNγ, and flow cytometry was performed.

Figure 21:
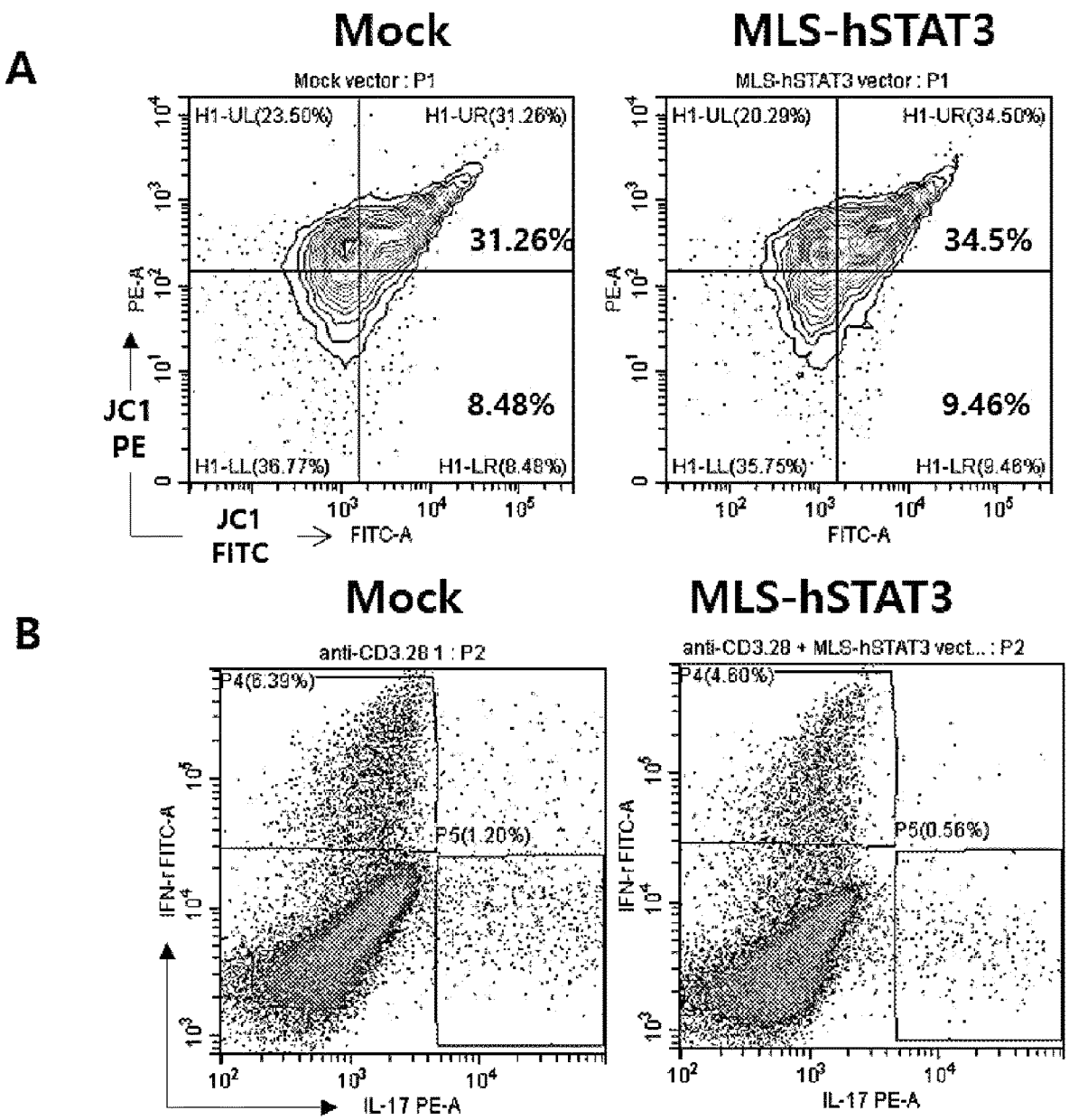
FIG. 21 shows the results of confirming the effects of MLS-human STAT3 on the mitochondrial function recovery and Th17 cell activity control.

As a result, it was confirmed that the mitochondrial potential was increased in PBMCs of normal persons administered with the MLS-human STAT3 overexpression vector, and that the etiological Th17 cells were decreased (FIG. 21).

Example 17. Control of Rheumatoid Arthritis Disease by MLS-Human STAT3 Overexpression Vector In order to prepare a rheumatoid arthritis-induced mouse model, DBA1/J mice was intradermally injected with type 2 collagen to induce arthritis. After arthritis induction, MLS-human STAT3 overexpression vector and control group vector were injected into mice at an amount of 50 μl/mice a total of 8 times, once a week through a hydrodynamic injection method. The hydrodynamic injection method is a method in which a gene is introduced into the cytoplasm through a cell membrane using physical force, and the recombinant vector of the present invention diluted in physiological saline is injected into the tail vein. For the booster of disease, type 2 collagen was mixed with the adjuvant (IFA) in a volume ratio of 1:1, and the mixture was injected on the tail. Two days later, MLS-human STAT3 was injected on the right thigh, and one week later, MLS-human STAT3 was re-injected on the left thigh. At this time, as the control group, a group injected with a mock vector not containing the Human STAT3 gene was used. Then, arthritis symptoms were measured.

Figure 22:
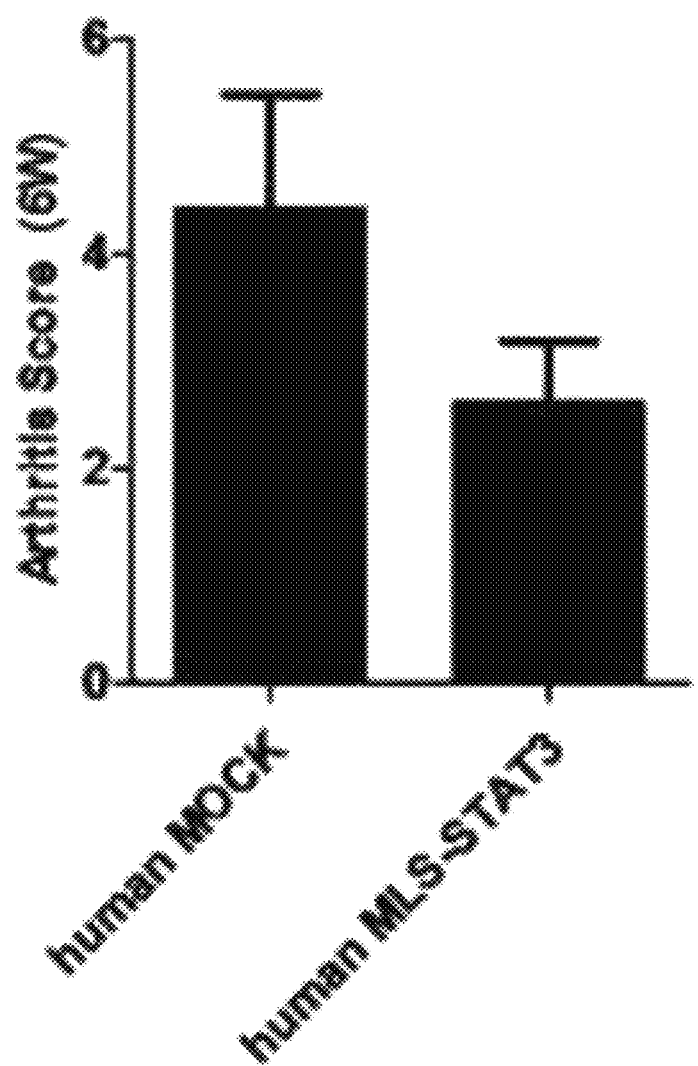
FIG. 22 shows the results of confirming the control effect of MLS-human STAT3 on rheumatoid arthritis disease.

As a result, as shown in FIG. 22, it was confirmed that the arthritis index of the mouse model of arthritis injected with the MLS-human STAT3 overexpression vector was significantly lower than that of the control group.

Therefore, the MLS-STAT3 overexpression vector of the present invention provides inhibition of Th17 activity, induction of Treg, an effect in alleviating rheumatoid arthritis induced by STAT3, inhibition of inflammatory macrophage M1 and regulation of anti-inflammatory macrophage M2 in inflammatory bowel disease and inhibitory ability to autoantibodies in autoimmune cerebrospinal disease so that it may be used as a composition for preventing or treating immune diseases.

The invention claimed is:

1. A recombinant peptide in which mitochondria localization sequence (MLS) peptide and signal transducer and activator of transcription 3 (STAT3) are fused, wherein the recombinant peptide comprises the amino acid sequence represented by SEQ ID NO: 1.

2. A composition for treating autoimmune diseases or inflammatory diseases, the composition comprising the recombinant peptide of claim 1 as an active ingredient.

* * * * *